US00RE47927E

(19) United States
(12) Reissued Patent
Ragner

(10) Patent Number: US RE47,927 E
(45) Date of Reissued Patent: Apr. 7, 2020

(54) ANNULAR-PLEATED CIRCULAR BRAID

(71) Applicant: Ragner Technology Corporation, Newberry, FL (US)

(72) Inventor: Gary Dean Ragner, Gainesville, FL (US)

(73) Assignee: Ragner Technology Corporation, Newberry, FL (US)

(21) Appl. No.: 16/259,233

(22) Filed: Jan. 28, 2019

Related U.S. Patent Documents

Reissue of:
(64) Patent No.: 9,844,921
Issued: Dec. 19, 2017
Appl. No.: 14/831,313
Filed: Aug. 20, 2015

U.S. Applications:
(63) Continuation-in-part of application No. 14/455,461, filed on Aug. 8, 2014, now Pat. No. 9,182,057.
(Continued)

(51) Int. Cl.
*D02G 3/22* (2006.01)
*D02G 3/32* (2006.01)
(Continued)

(52) U.S. Cl.
CPC ..... *B32B 7/12* (2013.01); *B32B 1/08* (2013.01); *B32B 5/024* (2013.01); *D02G 3/22* (2013.01);
(Continued)

(58) Field of Classification Search
CPC .. F16L 11/20; A63B 21/0552; A63B 21/0555; D07B 2201/2069;
(Continued)

(56) References Cited

U.S. PATENT DOCUMENTS 54,167 A * 4/1866 Hull ..... D04C 1/00 87/2
377,027 A * 1/1888 Green ..... D04C 1/12 87/2
(Continued)

FOREIGN PATENT DOCUMENTS

DE 2602502 7/1976
DE 19738329 3/1999
(Continued)

OTHER PUBLICATIONS

*Blue Gentian, LLC* v. *Tristar Products, Inc.*, in the United States District Court for the District of New Jersey, USA, Case No. 1:13-cv-01758, Letter to The Honorable Noel L. Hillman re new product of Tristar Products, Court Docket No. 183, submitted May 27, 2016, 2 pgs.
(Continued)

*Primary Examiner* — Russell D Stormer
(74) *Attorney, Agent, or Firm* — Vorys, Sayer, Seymour and Pease LLP

(57) ABSTRACT

Aspects of this disclosure can be used to implement a braided cover comprising a plurality of left handed fibers and a plurality of right-handed fibers braided into a hollow tube of fabric. Such a braided cover may be adapted to form a plurality of annular ridges and annular valleys along the longitudinal length of the braided cover when compressed from an extended length to a compressed length.

36 Claims, 5 Drawing Sheets

Related U.S. Application Data

Figure 2A:
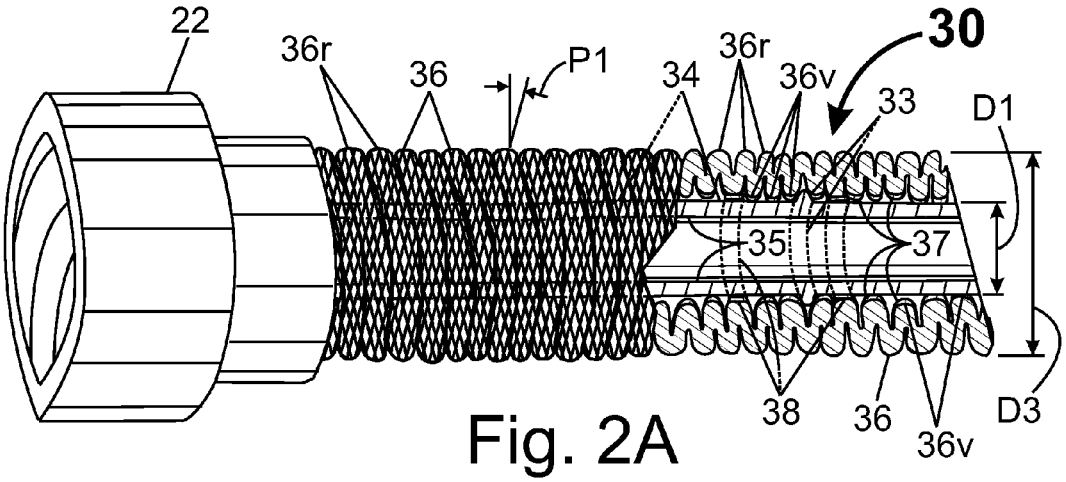

(60) Provisional application No. 62/078,358, filed on Nov. 11, 2014, provisional application No. 61/864,555, filed on Aug. 10, 2013.

(51) Int. Cl.

| | |
|---|---|
| ***F16L 57/06*** | (2006.01) |
| ***B32B 7/12*** | (2006.01) |
| ***F16L 11/12*** | (2006.01) |
| ***B32B 1/08*** | (2006.01) |
| ***B32B 5/02*** | (2006.01) |

(52) U.S. Cl.
CPC ..... *D02G 3/32* (2013.01); *F16L 11/12* (2013.01); *F16L 57/06* (2013.01)

(58) Field of Classification Search
CPC .... D07B 2201/2076; D07B 2201/2086; D07B 2201/20903
USPC ..... 57/200, 210, 217, 224, 225, 230, 232; 87/6, 8; 24/300, 301
See application file for complete search history.

(56) References Cited

U.S. PATENT DOCUMENTS 487,042 A * 11/1892 Ziegler ..... D04C 1/00 87/2
752,414 A * 2/1904 Price ..... D04C 1/00 57/225
2,396,059 A 3/1946 Roberts
2,867,833 A 1/1959 Duff
2,897,603 A * 8/1959 Behrman ..... A45D 20/18 138/121
2,927,625 A 3/1960 Rothermel
2,954,802 A 10/1960 Duff
3,028,290 A 4/1962 Roberts
3,050,087 A 8/1962 Caplan
3,288,169 A 11/1966 Moss
3,353,996 A 11/1967 Hamrick
3,486,532 A 12/1969 Sawada
3,520,725 A 7/1970 Hamrick
3,623,500 A 11/1971 Hoy
3,638,987 A * 2/1972 Fidrych ..... F16G 11/00 24/115 N
3,642,034 A 2/1972 Ullman
3,861,424 A 1/1975 Mizutani
3,953,270 A 4/1976 Ford
3,966,121 A 6/1976 Littman
4,009,734 A 3/1977 Sullivan
4,050,113 A 9/1977 Wright
4,096,888 A 6/1978 Stefano
4,136,149 A 1/1979 Payne
4,704,765 A 11/1987 Ataka
4,777,784 A * 10/1988 Ferguson ..... A01K 27/005 119/792
4,858,653 A * 8/1989 Huvey ..... F16L 59/125 138/129
4,955,106 A 9/1990 Stein
5,023,959 A 6/1991 Mercer
5,036,890 A 8/1991 Whaley
5,156,349 A 10/1992 Wilson
5,205,803 A * 4/1993 Zemitis ..... A63B 21/0552 482/121
5,485,870 A 1/1996 Kraik
5,526,842 A 6/1996 Christensen
5,538,513 A * 7/1996 Okajima ..... A61M 25/0012 138/124
5,555,915 A 9/1996 Kanao
5,607,107 A 3/1997 Grieve
5,740,851 A 4/1998 Haynes
5,778,941 A 7/1998 Inada
5,780,581 A 7/1998 Hermansen
6,024,132 A 2/2000 Fujimoto
6,024,134 A 2/2000 Akedo
6,098,666 A 8/2000 Wells
6,182,327 B1 2/2001 Gosselin
6,186,181 B1 2/2001 Schippl
6,202,263 B1 * 3/2001 Harker ..... B62J 7/08 114/230.2
6,223,777 B1 5/2001 Smith
6,382,241 B1 5/2002 Setrum
6,523,539 B2 2/2003 McDonald
6,607,010 B1 8/2003 Kashy
6,948,527 B2 9/2005 Ragner ..... A47L 9/24 138/118
6,983,757 B1 1/2006 Becker
7,156,127 B2 1/2007 Moulton
7,325,028 B1 1/2008 Smith
7,331,269 B2 2/2008 He ..... D04C 1/02 57/210
7,398,798 B2 7/2008 Ostan
7,454,818 B1 * 11/2008 Backman, III ..... B60P 7/0823 24/300
7,520,302 B2 4/2009 Smith
7,549,448 B2 * 6/2009 Ragner ..... F16L 11/118 138/109
7,794,374 B1 * 9/2010 Park ..... A63B 21/0004 482/122
8,272,407 B2 9/2012 Soyland
8,291,941 B1 10/2012 Berardi
8,291,942 B2 * 10/2012 Berardi ..... F16L 11/12 138/118
8,479,776 B2 7/2013 Berardi
8,757,213 B2 6/2014 Berardi
8,776,836 B2 7/2014 Ragner
8,936,046 B2 1/2015 Ragner
9,022,076 B2 5/2015 Ragner et al.
9,182,057 B2 11/2015 Ragner ..... F16L 11/118
9,279,525 B2 3/2016 Berardi
9,371,944 B2 6/2016 Ragner et al.
2002/0013974 A1 2/2002 Gibson
2004/0020546 A1 2/2004 Furuta
2004/0231096 A1 11/2004 Battle
2005/0093205 A1 5/2005 Martin
2006/0207047 A1 * 9/2006 Weyandt ..... A46B 13/003 15/230.13
2010/0005773 A1 * 1/2010 Lim ..... D07B 1/025 57/210
2010/0108170 A1 5/2010 Chudkosky
2012/0297746 A1 * 11/2012 Chou ..... D07B 1/02 57/230
2013/0113205 A1 5/2013 Berardi
2013/0180615 A1 7/2013 Ragner et al.
2014/0057103 A1 2/2014 Mozsgai
2016/0178092 A1 6/2016 Berardi
2016/0252199 A1 9/2016 Ragner et al.

FOREIGN PATENT DOCUMENTS

| | | |
|---|---|---|
| DE | 202013101116 U1 | 3/2013 |
| EP | 0965689 | 12/1999 |
| FR | 2336624 | 7/1977 |
| GB | 982951 | 2/1965 |
| GB | 1551429 | 8/1979 |
| GB | 2310369 | 8/1997 |
| JP | H 06-307584 A | 11/1994 |
| JP | 2002-206670 | 7/2002 |
| KR | 10-1187548 B1 | 10/2012 |
| WO | WO 85/00277 | 1/1985 |
| WO | WO 99/35954 | 7/1999 |
| WO | WO 03/024294 | 3/2003 |
| WO | WO 2012/122601 | 9/2012 |

OTHER PUBLICATIONS

International Search Report and Written Opinion dated Nov. 26, 2014 for Application No. PCT/US2014/050562, 7 pgs.

Application, Office Actions, Office Action Responses, Amendments, and Interview Summaries in the Patent Prosecution History for U.S.

(56) References Cited

OTHER PUBLICATIONS

Pat. No. 8,776,836, Granted Jul. 15, 2014, U.S. Appl. No. 11/343,602, filed Jan. 30, 2006, 442 pgs.
Application, Office Actions, Office Action Responses, Amendments, and Interview Summaries in the Patent Prosecution History for U.S. Pat. No. 9,022,076, Granted May 5, 2015, U.S. Appl. No. 14/262,108, filed Apr. 25, 2004, 230 pgs.
Application, Office Actions, Office Action Responses, Amendments, and Interview Summaries in the Patent Prosecution History for U.S. Pat. No. 9,371,944, Granted Jun. 21, 2016, U.S. Appl. No. 14/698,382, filed Apr. 28, 2015, 311 pgs.
Application, Office Actions, Office Action Responses, Amendments, Interview Summaries, and Appeal Briefs in the Patent Prosecution History for U.S. Appl. No. 96,000,126, filed Aug. 24, 2015, Reexamination for U.S. Pat. No. 9,022,076, Granted May 25, 2015, 13 parts, Parts 1-12, 300 pgs. each, Part 13, 286 pgs.
*Telebrands Corp.* v. *Ragner Technology Corporation,* Before the Patent Trial and Appeal Board, U.S. Pat. No. 9,182,057, Issued Nov. 10, 2015; Petition for Post-Grant Review Pursuant to 35 U.S.C. §§ 321-328 and 37 C.F.R. §§ 42.200 et seq., dated Jun, 15, 2016, 65 pgs.
*Telebrands Corp.* v. *Ragner Technology Corporation,* Before the Patent Trial and Appeal Board, U.S. Pat. No. 9,182,057, Issued Nov. 10, 2015; Declaration of Dr. Ken Kamrin in Support of Petitioner Telebrands Corp.'s petition for Post-Grant review of U.S. Pat. No. 9,182,057, dated Jun. 14, 2016, 25 pgs.
*Telebrands Corp.* v. *Ragner Technology Corporation,* Before the Patent Trial and Appeal Board, U.S. Pat. No. 9,182,057, issued Nov. 10, 2015; Patent Owner's Preliminary Response Under 37 C.F.R. § 42.207 to the Petition for Post-Grant Review, dated Aug. 29, 2016, 82 pgs.
*Telebrands Corp.* v. *Ragner Technology Corporation,* Before the Patent Trial and Appeal Board, U.S. Pat. No. 9,182,057, Issued Nov. 10, 2015; Patent Owner's Preliminary Response Under 37 C.F.R. § 42.207; Exhibit 2001, Patent Prosecution History for U.S. Pat. No. 9,182,057, Granted Nov. 10, 2015, U.S. Appl. No. 14/455,461, filed Aug. 8, 2014, 148 pgs.
*Telebrands Corp.* v. *Ragner Technology Corporation,* Before the Patent Trial and Appeal Board, U.S. Pat. No. 9,182,057, Issued Nov. 10, 2015; Patent Owner's Preliminary Response Under 37 C.F.R. § 42.207; Exhibit 2002, Complaint, *Telebrands Corp.* v. *Ragner Technology Corporation and Tristar Products, Inc.,* U.S. District Court for the District of New Jersey, Case No. 2:16-cv-03474, dated Jun. 15, 2016, 16 pgs.
*Telebrands Corp.* v. *Ragner Technology Corporation,* Before the Patent Trial and Appeal Board, U.S. Pat. No. 9,182,057, issued Nov. 10, 2015; Patent Owner's Preliminary Response Under 37 C.F.R. § 42.207; Exhibit 2003, Article: Buss, D., "Pocket Hose Gushes Revenue for Direct-Response Leader TeleBrands," Forbes, Jul. 10, 2014, downloaded from http://ww.forbes.com/sites/dalebuss/2014/07/10/pocket-hose-gushes-revenues-for-drtv-leader-telebrands/print, 4 pgs.

* cited by examiner

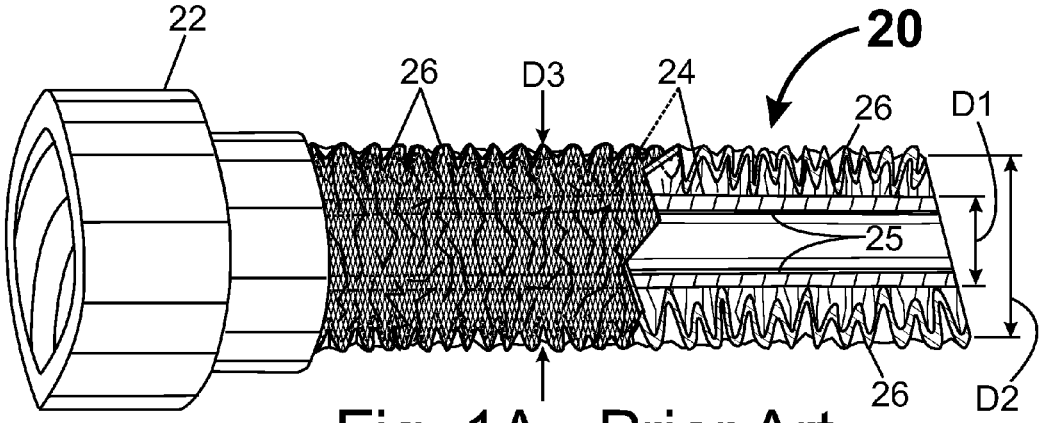
Fig. 1A - Prior Art
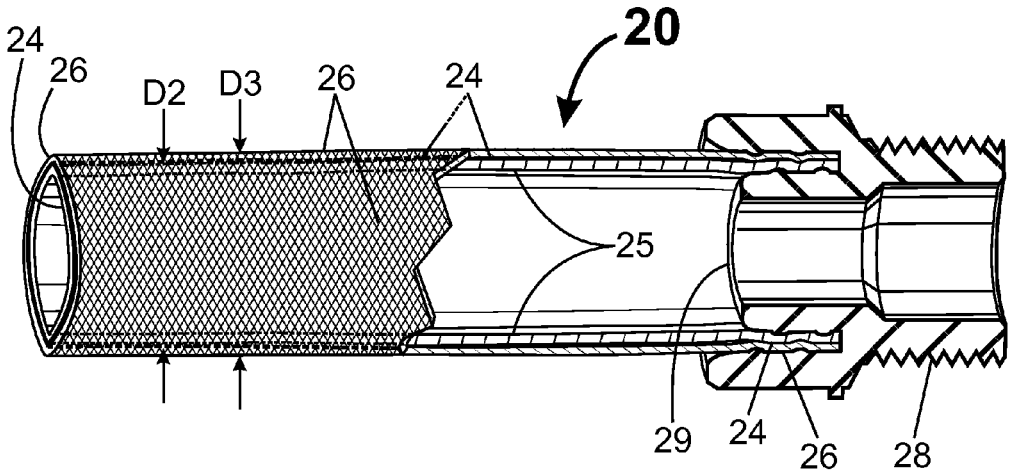
Fig. 1B - Prior Art

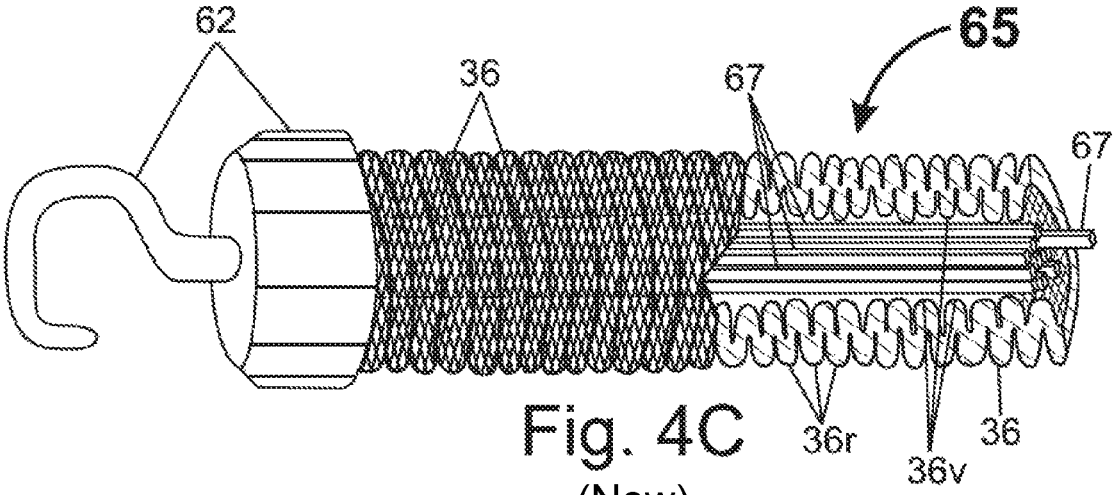
Fig. 4C
(New)

ANNULAR-PLEATED CIRCULAR BRAID

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATIONS

This is a continuation in part of, and claims priority from, U.S. patent application Ser. No. 14/455,461 filed on Aug. 8, 2014 titled "Retractable Elastic Bungee Hose", which is itself a non-provisional of, and claims priority from, U.S. provisional patent application 61/864,555, filed Aug. 10, 2013, titled "Retractable Elastic Bungee Hose." This document also claims priority from U.S. Provisional Patent Application 62/069,831, filed on Oct. 29, 2014, titled "Pleating Machine for Braided Covers", and U.S. Provisional Patent Application 62/078,358, filed on Nov. 11, 2014, titled "Pleating Machine for Braided Tubes". The disclosures of each of those documents, except for provisional patent application 62/078,358, are hereby incorporated by reference in their entireties.

BACKGROUND OF INVENTION

The disclosed technology can be used to implement hollow braided covers, and more specifically [to] hollow braided covers that extend lengthwise when an extending longitudinal force is applied, and retract lengthwise when a retracting longitudinal force is applied.

BACKGROUND

Prior Art

The present state of the art *of* linearly extendable and retractable hoses includes both spring biased and elastic biased hoses. Prior art designs seen in U.S. Pat. No. 8,291,941 and U.S. Pat. No. 8,479,776 comprise two connector ends with an inner elastic tube and an inelastic outer cover. The outer cover and the inner elastic tube are connected at one end to an inlet connector (source connector) and connected at their other end to an outlet connector. The inelastic outer cover is generally unattached, unbonded, and unsecured to the inner elastic tube between the two connector ends. The outer covers comprise a braided or woven nylon, polyester or polypropylene, and/or other braided or woven material. The braided or woven outer cover is designed to not expand radially or longitudinally so that, the actual length and width of the outer cover determines the maximum length and maximum width of the hose in its expanded condition. Thus, this final length and diameter of the non-elastic outer cover is the final diameter and the final length of the extendable and retractable hose when it is in its expanded condition and in use to transport or deliver a fluid. These prior art elastic hoses also have covers that maintain the same wall thickness in both the extended and retracted positions. This means that the outer cover must fold when *the* hose retracts.

SUMMARY

The disclosed technology can be used to create an annularly pleated circular braid that allows for much greater extension ratios than are currently possible with a standard braided cover. This is because the annular pleats on the braided cover allow the braided fabric to compress more compactly longitudinally. The disclosed annularly pleated circular braid can be used to implement both bungee cords and self-extending hoses with expansion ratios well over 6-to-1. The disclosed technology can also be used to implement elastic extendible and retractable hoses 30, 40 and 50 (bungee hoses) and bungee cords 60 [and], 63[,] *and* which can comprise a pleated bungee-like outer cover 36 to provide greater extension ratios, better environmental wear resistance (i.e. friction with ground) and/or lower stresses between inner elastic tubes 34 and 44, and outer cover 36. Unlike prior art outer cover 26 which defines a maximum length and a maximum width (diameter), the disclosed outer cover 36 can extend and contract lengthwise (longitudinally), and also expand and contract width-wise (radially).

The disclosed elastic retractable and extendible pressure hoses 30, 40 and 50 will also be referred to in this document as an "elastically retractable pressure hose", "elastic retractable hose", "retractable hose", "elastic bungee hose", "bungee hose", and possibly other similar terms. These bungee hose designs can be implemented with an outer cover 36 that has significantly different properties and structure from prior art outer covers. For example, outer cover 36 can be braided, knitted, woven, and/or wrapped so that it can widen radially when it is longitudinally retracted and constrict radially when longitudinally lengthened. This means that outer cover 36 may have neither a well-defined maximum length, nor a well-defined maximum diameter (width). Outer cover 36 seen in FIGS. 2A-B, comprises a braided fabric tube that can comprise fibers or yarns 36a-b made of fibers (e.g., high strength fibers such as nylon fibers, polyester fibers, polypropylene, cotton, combinations of different fibers, etc.). The length and width of such an outer cover 36 may depend on tensions and pressures exerted on the retractable hose, both from the interior and exterior of the hose. Thus, the length and diameter of the disclosed retractable hoses 30, 40 and 50 can change depending on the user applied tensions on the exterior and the fluid pressures exerted on the interior of hoses. Thus, while prior art retractable hoses may extend to a predetermined maximum length and/or maximum width, outer cover 36 can be designed to be stretchable during use and may be adapted to be stretched significantly even after reaching an apparent maximum length from fluid pressure alone.

Outer cover 36 can have a similar structure to the braided cover on prior art bungee cords or shock cords commonly found today. Outer cover 36 and bungee cord covers can extend and retract with their inner elastic cores (which could be, for example, an elastic tube or a set of one or more elastic cords) without the need for significant folding or unfolding of the outer cover material, or significant motion between the elastic inner core and the outer cover. However, to achieve significant expansion ratios for the hoses disclosed herein, a controlled pleating of the outer cover can be used. Thus, outer cover 36 can be designed to fold and compress into evenly spaced and like-sized annular ridges 36r (pleats) along its length when retracted. This can provide an improved appearance for the elastic retractable hose in its retracted position when compared to prior art retractable elastic hoses which generally fold into a haphazard jumble of folded fabric along its length. Like a bungee cord, outer cover 36 can be designed to increase in diameter and thickness as it retracts longitudinally to provide a smooth transition between extended and retracted lengths. The result is that an outer cover 36 such as disclosed herein can provide a substantially even and smooth exterior for retractable hoses 30, 40 and 50 when fully retracted and provide a finished and an esthetically pleasing look to bungee hoses 30, 40 and 50.

The outer ridges 36r of cover 36 can also be coated with a wear resistant material to create wear rings 39. This can provide a more durable exterior surface for cover 36, and also help cover 36 consistently return to its pleated retracted shape. Outer cover 36 can also have a wall thickness that can thicken as cover 36 is retracted and thin as cover 36 is extended lengthwise (extend longitudinally). These properties of outer cover 36, where they are present, can provide retractable hoses 30, 40 and 50 with the feel of a bungee-cord both when extended and retracted, as well as providing other benefits, such as a better esthetic appearance when retracted, greater extension to retracted length ratios, and the ability to use higher denier yarns to improve the wear resistance of outer cover 36. Also an outer cover 36 can be implemented to have the ability to move and expand with inner elastic tubes 34 and 44, which can reduce wear on the outer surface of elastic tube 34 and 44 thereby increasing the useful life of hoses 30, 40 and 50.

OBJECTIVES AND ADVANTAGES

Accordingly, several objects and advantages which can be obtained using various embodiments of the disclosed technology are:

Protecting Inner Elastic Tube a) To provide an elastically retractable pressure hose (bungee hose) comprising a braided, knitted, woven, and/or wrapped reinforcement outer cover that can extend and retract along with an inner elastic tube to reduce friction and wear between the inner elastic tube and reinforced outer cover.

b) To provide an elastically retractable pressure hose comprising a hollow braided reinforcement outer cover that can extend and retract along with an inner elastic tube to reduce friction and wear between the inner elastic tube and reinforced outer cover.

c) To provide an elastically retractable pressure hose comprising a braided, knitted, woven, and/or wrapped reinforcement outer cover that can extend and retract along with an inner elastic tube to reduce friction and wear between the inner elastic tube and reinforced outer cover, with a solid lubricant applied to the interior of the outer reinforcement cover and/or to the outer surface of the inner elastic tube.

d) To provide an elastically retractable pressure hose comprising a hollow braid outer cover that can extend and retract along with an inner elastic tube to reduce friction and wear between the inner elastic tube and reinforced outer cover, with a solid lubricant applied to the interior of the outer reinforcement cover and/or to the outer surface of the inner elastic tube.

e) To provide an elastically retractable pressure hose comprising a braided, knitted, woven, and/or wrapped reinforcement outer cover that can extend and retract along with an inner elastic tube to reduce friction and wear between the inner elastic tube and reinforced outer cover, with a lubricant applied to the interior of the outer reinforcement cover and/or to the outer surface of the inner elastic tube.

f) To provide an elastically retractable pressure hose comprising a hollow braided outer cover that can extend and retract along with an inner elastic tube to reduce friction and wear between the inner elastic tube and reinforced outer cover, and a solid lubricant applied to the interior of the outer reinforcement cover and/or to the outer surface of the inner elastic tube.

g) To provide an elastically retractable pressure hose comprising a hollow braided outer cover that can extend and retract along with an inner elastic tube to reduce friction and wear between the inner elastic tube and reinforced outer cover, and a liquid lubricant applied to the interior of the outer cover and/or to the outer surface of the inner elastic tube.

h) To provide an elastically retractable pressure hose comprising a braided, knitted, woven, and/or wrapped reinforced outer cover and an inner elastic tube, where the structure of the outer cover allows it to extend and contract longitudinally with the inner elastic tube.

i) To provide an elastically retractable pressure hose comprising a braided, knitted, woven, and/or wrapped reinforced outer cover and an inner elastic tube, where the structure of the outer cover increases in diameter when compressed longitudinally and decreases in diameter when extend longitudinally, whereby the outer cover can extend and retract along with the inner elastic tube to reduce friction and wear between the inner elastic tube and reinforcement outer cover.

j) To provide an elastically retractable pressure hose comprising a reinforcement outer cover and an inner elastic tube, where the structure of the outer cover allows it to extend and contract longitudinally with the inner elastic tube and wherein a plurality of friction and/or bonding points are defined on the retractable pressure hose that bond the inner elastic tube to the interior surface of outer cover to stabilize the inner elastic tube and minimize localized overstretching and breakage of the inner elastic tube.

k) To provide an elastically retractable pressure hose comprising a reinforcement outer cover and an inner elastic tube with a plurality of protrusions on the inner elastic tube (ring shaped protrusions, bumps, etc.) for stabilizing the inner elastic tube within the reinforcement cover to prevent localized overstretching and breakage of the inner elastic tube, where the structure of the outer cover allows it to extend and contract longitudinally with the inner elastic tube.

l) To provide an elastically retractable pressure hose comprising a reinforcement cover and an inner elastic tube with a plurality of ring shaped bonds between the reinforcement cover and the inner elastic tube are used to stabilize the inner elastic tube within the reinforcement cover to prevent localized over-stretching and breakage of the inner elastic tube, where the structure of the outer cover allows it to extend and contract longitudinally with the inner elastic tube.

m) To provide an elastically retractable pressure hose comprising a reinforcement outer cover and an inner elastic tube, wherein the structure of the outer cover allows it to extend and contract longitudinally with the inner elastic tube, wherein the inner elastic tube has a natural outside diameter that is substantially the same as the natural inside diameter of the outer cover when the hose is collapsed, and wherein the inner elastic tube provides support for the outer cover when the hose is retracted so that the outer cover retracts to a smooth exterior surface (very few folds in outer cover fabric).

n) To provide an elastically retractable pressure hose comprising a reinforcement outer cover and an inner elastic tube, wherein the structure of the outer cover allows it to extend and contract longitudinally with the inner elastic tube, wherein the inner elastic tube has a natural length that is matched to the length of the outer cover when compressed longitudinally, so that the outer cover collapses to a smooth outer surface and fibers making up the outer cover are snugly packed longitudinally, and wherein the inner elastic tube provide support for the outer cover when the hose is retracted, but does not bind against the outer cover when retracted.

Bonded Elastic Tube o) To provide an elastically retractable pressure hose (bungee hose) comprising a tube shaped outer reinforcement cover and an inner elastic tube (inner elastic hose), where the inner elastic tube provides a retracting bias to retract the retractable pressure hose, where the inner elastic tube is bonded to the outer reinforcement cover at a plurality of separate areas to control the longitudinal collapse and folding of the outer reinforcement cover when the linearly retractable pressure hose retracts, wherein the structure of the outer cover allows it to extend and contract longitudinally with the inner elastic tube.

p) To provide an elastically retractable pressure hose comprising a tube shaped outer reinforcement cover and an inner elastic tube, where the inner elastic tube provides a retracting bias to retract the retractable hose, wherein the structure of the outer cover allows it to extend and contract longitudinally with the inner elastic tube, wherein the inner elastic tube is bonded periodically to the outer reinforcement cover with a plurality of annular ring shaped bonds for longitudinal controlling the collapse and folding of the outer reinforcement cover when the linearly retractable pressure hose retracts, and wherein an optional lubricant can be applied between the plurality of annular ring shaped bonds to the interior surface of the outer reinforcement cover and/or to the exterior surface of the inner elastic tube to reduce friction between the two surfaces.

q) To provide an elastically retractable pressure hose comprising an outer reinforcement cover encompassing an inner elastic tube, wherein the structure of the outer cover allows it to extend and contract longitudinally with the inner elastic tube, where the inner elastic tube provides a retracting bias to retract the retractable hose, wherein the inner elastic tube is bonded to the inside of the outer reinforcement cover with a plurality of small bonding spots or dots across its surface to control the longitudinal collapse and folding of the outer reinforcement cover when the linearly retractable pressure hose retracts and extends, and wherein an optional lubricant can be applied between the plurality of small bonding spots or dots to the interior surface of the outer reinforcement cover and/or to the exterior surface of the inner elastic tube to reduce friction between the two surfaces.

r) To provide an elastically retractable pressure hose comprising an outer reinforcement cover and an inner elastic tube, where the inner elastic tube is a substantially cylindrical tube and provides a retracting bias for retracting the retractable hose, wherein the structure of the outer cover allows it to extend and contract longitudinally with the inner elastic tube, wherein the inner elastic tube is bonded periodically to the inside of the reinforcement outer cover to control the longitudinal collapse and folding of the reinforcement outer cover when the linearly retractable pressure hose retracts, wherein an optional lubricant can be applied between the periodic bonds to the interior surface of the outer reinforcement cover and/or to the outer surface of the inner elastic tube to reduce friction between the two surfaces.

s) To provide an elastically retractable pressure hose comprising a reinforcement outer cover and an inner elastic tube, wherein the structure of the outer cover allows it to extend and contract longitudinally with the inner elastic tube, wherein the inner elastic tube has a plurality of protrusions on its exterior surface (e.g. ridges, bumps, etc.) and provides a retracting bias for retracting the retractable hose, wherein the inner elastic tube has a natural outside diameter that is substantially the same as the natural inside diameter of the outer cover when the hose is collapsed, wherein the inner elastic tube provide support for the outer cover when the hose is retracted so that the outer cover retracts to a smooth exterior surface (few misplaced or misshaped folds in outer cover fabric).

t) To provide an elastically retractable pressure hose comprising a reinforced outer cover and an inner elastic tube, wherein the structure of the outer cover allows it to extend and contract longitudinally with the inner elastic tube, wherein the inner elastic tube has a plurality of protrusions on its exterior surface (e.g., ridges, bumps, etc.) and provides a retracting bias for retracting the retractable hose, wherein the inner elastic tube has a natural length that is matched to the length of the outer cover when compressed longitudinally, so that the outer cover collapses to a smooth outer surface and fibers making up the outer cover are snugly packed longitudinally, wherein the inner elastic tube provide support for the outer cover when the hose is retracted but does not bind against the outer cover when retracted.

u) To provide an elastic retractable pressure hose such as described in items e) through t) wherein a solid lubricant is such as a paraffin wax, Teflon coating, and/or other solid polymer coatings is used between the inner elastic tube and outer cover.

v) To provide an elastic retractable pressure hose such as described in items e) through t) wherein a liquid lubricant such as a natural oil, synthetic oil, gel, or other oily liquid is used between the inner elastic tube and the outer cover.

w) To provide an elastic retractable pressure hose such as described in items e) through t) wherein a lubricant between the inner elastic tube and the outer cover reduces chaffing and wear on the exterior surface of the inner elastic tube.

x) To provide an elastic retractable pressure hose that has a retracted length and a wide range of extended lengths dependent on tension supplied by the use to the exterior of the hose.

Pleated Circular Braid y) To provide a hollow or circular braided tube with annular pleats formed along a longitudinal length of the braided tube.

z) To provide a hollow or circular braided tube adapted to form annular pleats along its length when shortened to a retracted position.

aa) To provide a hollow or circular braided tube with annular pleats that are heat set into yarn used to form the braided tube.

bb) To provide a hollow or circular braided tube with annular pleats that are heat set into yarn used to form the braided tube, wherein the heat set comprises melting the outer annular ridges of the pleats.

cc) To provide a hollow or circular braided tube with annular pleats that are heat set into yarn used to form the braided tube, wherein the heat set comprises bonding a ring polymer to the outer annular ridges of the annular pleats.

DRAWING FIGURES

FIG. 1A Prior Art elastic retractable hose input end (faucet connector end).

FIG. 1B Prior Art elastic retractable hose output end (nozzle connector end).

FIG. 2A Elastic retractable stretch hose with a retractable braided outer cover (retracted).

Figure 2B:
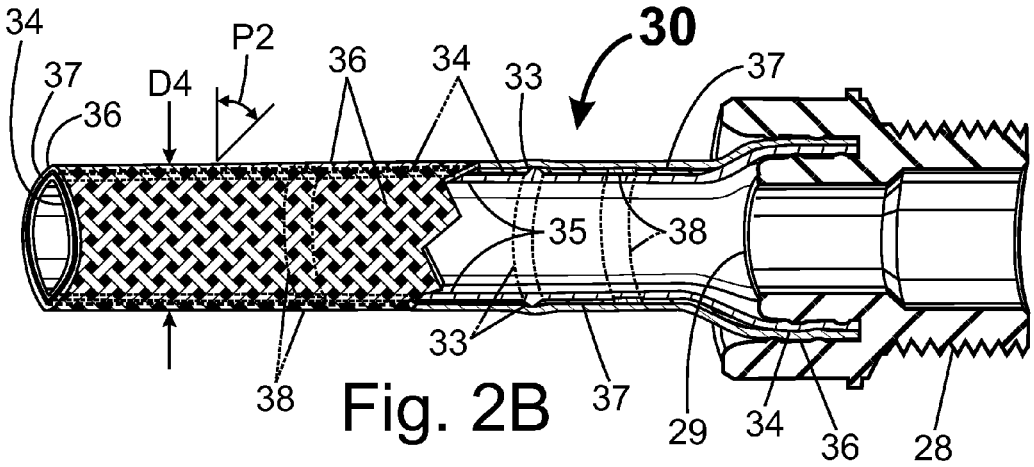

FIG. 2B Elastic retractable stretch hose with a retractable braided outer cover (expanded).

Figure 2C:
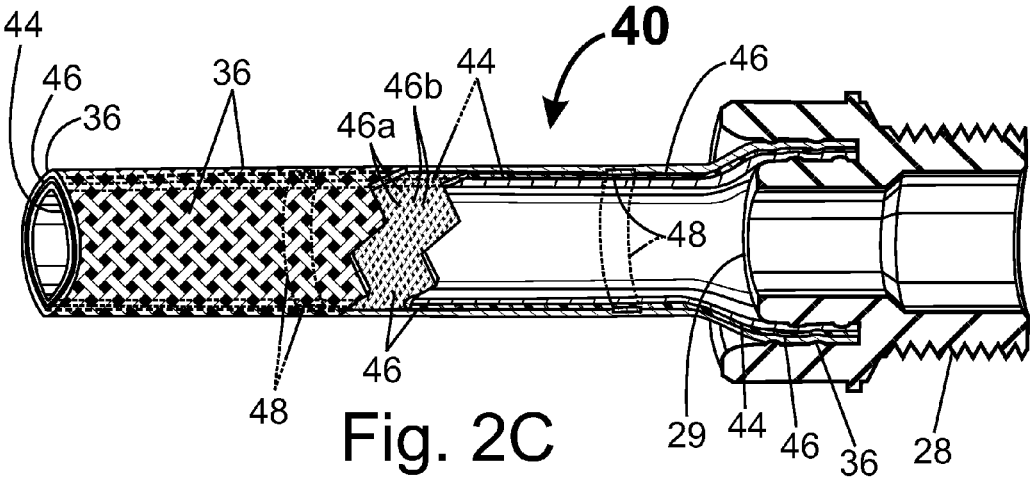

FIG. 2C Elastic retractable stretch hose with a double retractable braided outer cover (expanded).

Figure 3A:
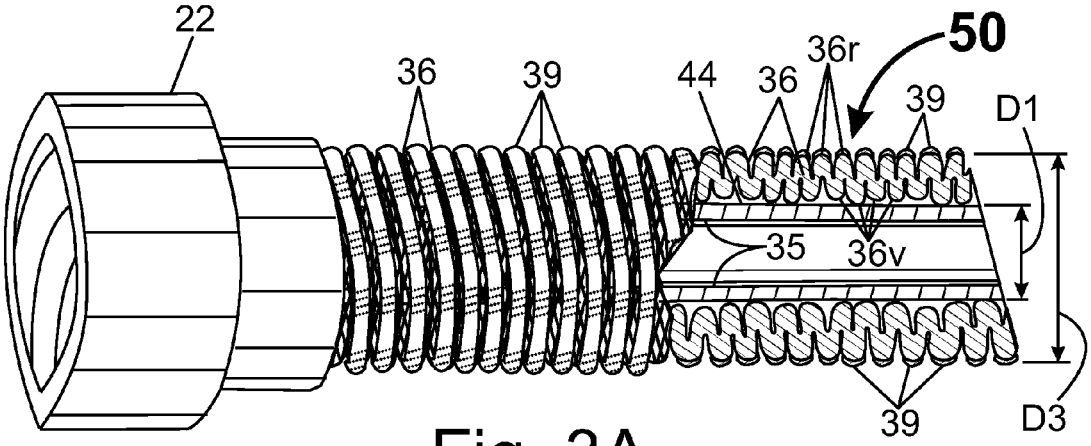

FIG. 3A Elastic retractable stretch hose with a plurality of wear resistant rings bonded to the braided outer cover at the ridges of the circular pleats formed when retracted.

Figure 3B:
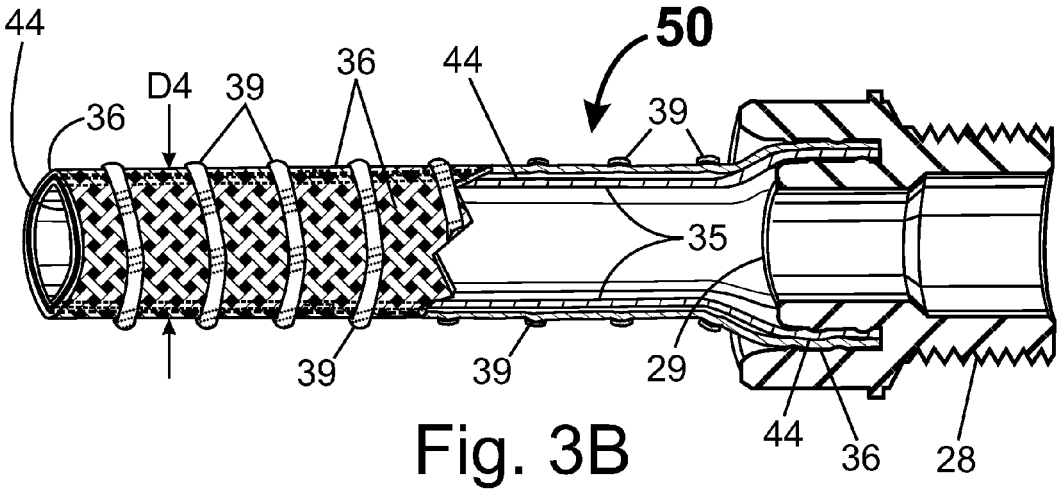

FIG. 3B Elastic retractable stretch hose with wear resistant rings bonded to the braided outer cover (expanded).

Figure 4A:
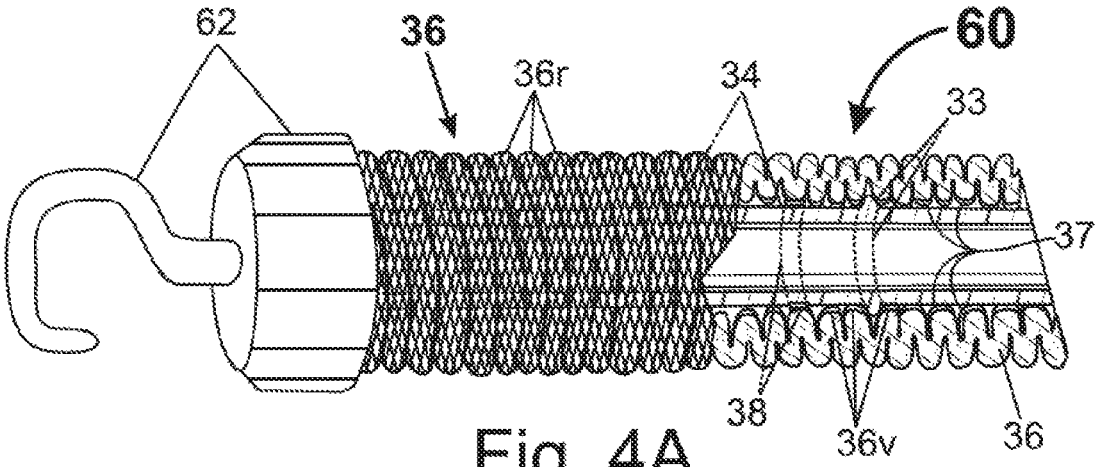

FIG. 4A Elastic bungee cord comprising a pleated braided cover around an inner elastic tube.

Figure 4B:
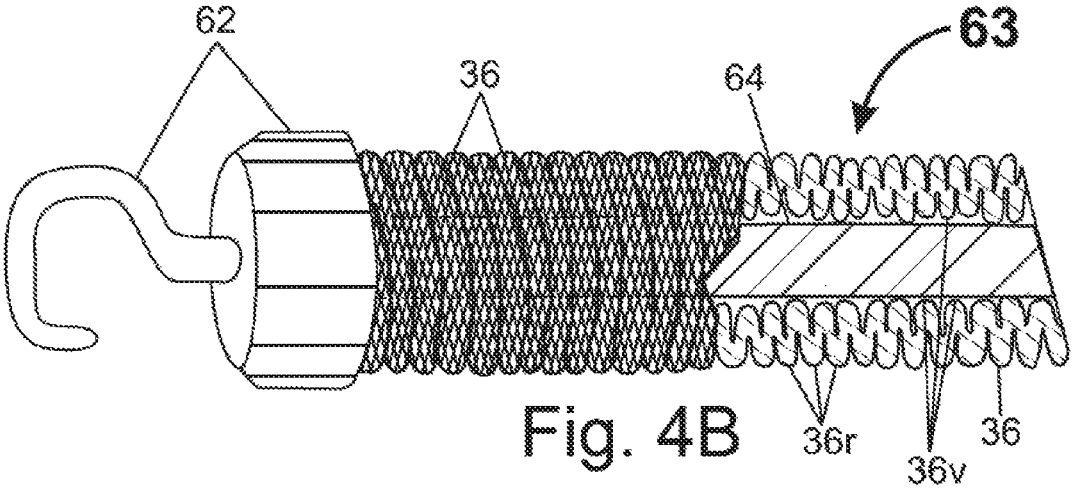

FIG. 4B Elastic bungee cord comprising a pleated braided cover and an inner solid elastic cord.

*FIG. 4C Elastic bungee cord comprising a pleated braided cover and an inner plurality of elastic cords.*

Figure 5A:
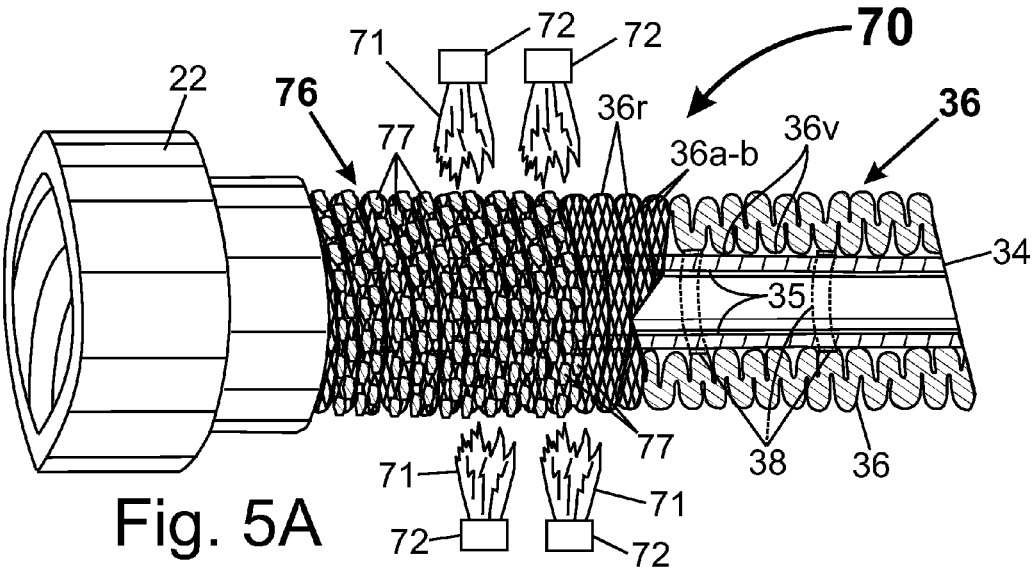

FIG. 5A Bungee hose 30 with outer pleated cover 36 being heat set.

Figure 5B:
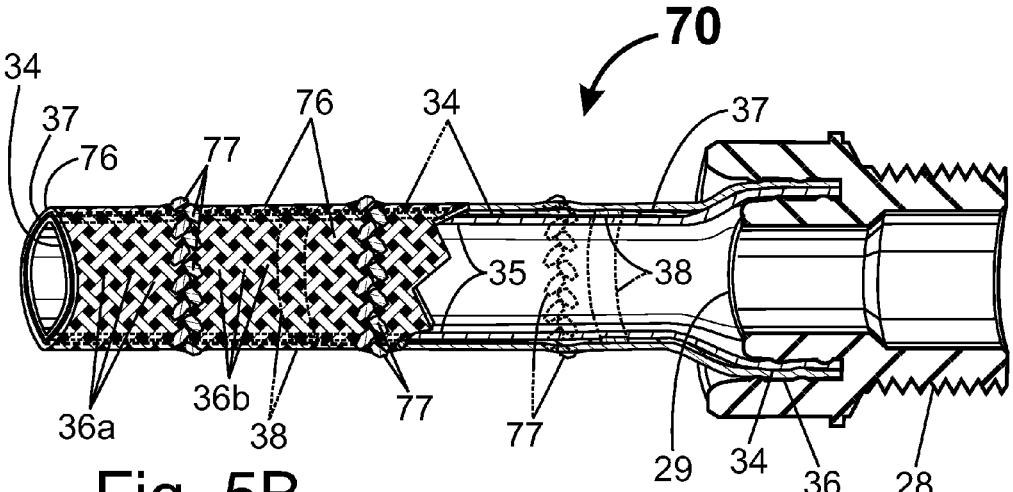

FIG. 5B Bungee hose 30 with outer pleated cover 36 heat set with melted sections 77.

DEFINITION OF TERMS

FULLY RETRACTED LENGTH or Retracted Length—this should be understood as, for a Bungee hose (retractable hose) and the components disposed along its length (e.g., outer cover 36, inner elastic tube 34, etc) the length of the hose or those components when they are fully retracted (i.e., when there is substantially no fluid pressure within its elastic tube and a minimal amount of external tension on the bungee hose itself).

EXTENDED LENGTH—this should be understood as, for a retractable hose and the components disposed along its length, the length the hose or those components extend to when the hose is pressurized with a fluid and no extension forces are applied other than fluid pressure.

FULLY EXTENDED LENGTH—this should be understood as, for a retractable hose and the components disposed along its length, the length to which the hose or components return when (1) an external pressure which stretched the hose to its Maximum Stretched Length (defined infra) has been removed and (2) there is a differential between ambient pressure and pressure for fluid inside the hose sufficient to extend the hose at its extended length. In general, the Fully Extended Length for a given hose or component will be greater than the Extended Length for that same hose or component, due to resistance exerted by the components of the hose to fully returning to the Extended Length. The differential between Fully Extended Length and Extended Length for any particular hose will largely be based on the friction between the components making up the hose. For lubricated hoses the Fully Extended Length might only be a few percent longer than the Extended Length, while for nonlubricated hoses, the Fully Extended Length might be up to fifteen percent (or more) longer than the Extended Length.

MAXIMUM STRETCHED LENGTH—this should be understood as, for a retractable hose and the components disposed along its length, the length of the hose (or components) when the hose has reached the approximate maximum length to which it can safely be stretched. In most cases this is significantly beyond the Fully Extended Length of the bungee hose (e.g., the Maximum Stretched Length could exceed the Extended Length by 25% or more, while the Fully Extended Length will generally only be 10-15% longer than the Extended Length). For example, in a recent bungee hose prototype, the prototype bungee hose had a Fully Retracted Length of four feet, and would grow to approximately twelve feet from water pressure alone (its Extended Length). After the user pulled on the end of the prototype hose and released it, the prototype bungee hose would maintain a length slightly over thirteen feet (its Fully Extended Length). However, the user could then pull on the end of the bungee hose and stretch it out to twenty feet using about two-hundred Newton (forty-five pounds) of force (tension). This might be considered its Maximum Stretched Length, since greater tension could cause the hose to exert a retractive force which could be high enough to be unsafe for the user, even though the breaking strength of the prototype hose's outer cover was over 2,000 Newton (approximately five-hundred pounds) and more force could be applied to lengthen the hose slightly further. However, application of tension force beyond two-hundred Newton will only slightly further increase the length of the hose and is thus a reasonable force to create a maximum stretched length.

PITCH ANGLE—this should be understood as the angle between the longitudinal axis of fibers comprised by an outer cover and the transverse direction for that cover (transverse direction is shown as vertical in FIGS. 2A-C). The transverse direction can also be defined as the direction perpendicular to the longitudinal axis of the hose). In a case where the outer cover of a hose folds into a pleated shape when the hose is at its Retracted Length, this Pitch Angle can be found by following a single fiber from one ridge to the next and finding the angle they inscribe around the hose.

DETAILED DESCRIPTION OF THE INVENTION

In FIGS. 1A-B, we see a perspective section view of a prior art retractable stretch hose 20 (retractable pressure hose). FIG. 1A shows hose 20 in its relaxed state (depressurized), while FIG. 1B shows hose 20 in its pressurized operational state. Retractable hose 20 comprises an inner elastic hose 24 (inner elastic tube), a woven reinforcement outer cover 26, an inlet connector 22, and an outlet connector 28. An inlet connector 22 is attached to one end of both the inner elastic tube 24 and outer cover 26, and outlet connector 28 is connected to the other end of inner elastic tube 24 and outer cover 26. Inner elastic tube 24 and outer cover 26 are only attached (secured) at the connectors and are free to slide longitudinally with respect to one another between connectors 22 and 28. Inlet connector 22 is designed to attach to a standard residential water faucet. Outlet connector 28 is designed to connect to a spray nozzle or other garden hose nozzle which acts as a flow restriction device to increase pressure within the hose to expand it. Outlet connector 28 also includes its own flow restriction ridge 29 to increase internal pressure that helps expand elastic tube 24. When water pressure is released, the pressure inside retractable hose 20 can return to atmospheric pressure and the elastic nature of elastic tube 24 pulls hose 20 back to its retracted state seen in FIG. 1A.

In FIGS. 1A-B, outer cover 26 comprises a tube-shaped reinforcement that is composed of woven high-strength fibers, and designed to have a predefined length and width (diameter) and to support the operating pressure conducted within inner elastic tube 24. Outer cover 26 comprises a relatively thin wall of woven fibers so that during retraction outer cover 26 can fold and crumple to a shorter length. Outer cover 26 maintains substantially the same wall thickness when crumpled to the retracted length of hose 20. Outlet connector 28 comprises a flow restriction ridge 29 to generate pressure within interior channel 25 of elastic tube 24. Inner elastic tube 24 extends through reinforcement outer cover 26 where the natural length of inner elastic tube 24 is about one-third the natural length of woven outer cover 26. Inner elastic tube 24 has a natural outside diameter D1 (no stress), and outer reinforcement cover 26 has a natural inside diameter D2 (not crumpled). Outside diameter D1 of elastic tube 24 is approximately one-half the inside diameter D2 of outer cover 26. This difference in diameter between D1 and D2 is to allow significant longitudinal extension of the retractable hose 20 before the elastic tube 24 is forced up against the interior surface of outer cover 26. This helps protect the inner elastic tube from being over extended by the expanding outer cover when pressurized. Both inner elastic tube 24 and outer cover 26 are cylindrical in shape and when elastic tube 24 is pressurized from within with a liquid and/or a gas, elastic tube 24 is forced to expand both radially and longitudinally against outer cover 26. In this extended position, as seen in FIG. 1B, outer cover 26 has an inside diameter D2 and an outside diameter D3. In prior art elastic retractable hoses, the thickness of outer cover 26 determines the difference between diameters D2 and D3, with thicker outer covers used to provide more wear resistance. The thickness of outer cover 26 is substantially fixed as it extends and retracts, and outer cover 26 folds the tube shaped outer cover 26 when it retracts as seen in FIG. 1A. Prior art elastic retractable hoses are designed with outer cover 26 having a maximum diameter and fixed longitudinal length for the hose when pressurized (see prior art in U.S. Pat. No. 8,291,941 and U.S. Pat. No. 8,479,776). Thus when prior art elastic retractable hoses similar to elastic retractable hose 20 are used, the internal pressure within inner tube 24 can straighten the folds in outer cover 26 and extend it to its maximum length (fully extended length) and also expand it radially to its maximum diameter (smooth cylindrical exterior) as seen in FIG. 1B. Once fully inflated and extended, outer cover 26 is designed to have a predetermined length and width (diameter). To provide this fixed maximum diameter and maximum length for outer cover 26, prior art elastic retractable hoses use a woven, or braided fabric cover that has longitudinal yarns running lengthwise to provide a maximum length for the outer cover, and one or more radial yarns that are substantially aligned with the circumference of the outer cover to provide a maximum diameter for the outer cover.

In FIGS. 2A, and 2B, we see elastic retractable stretch hose 30 (bungee hose) comprising an inlet connector 22, an inner elastic tube 34 with a plurality of annular ridge protrusions 33 (optional), a stretchable reinforced outer cover 36, an outlet connector 28, a lubricant 37, and one or more bonding rings 38 (optional) for bonding elastic tube 34 to outer cover 36. FIG. 2A shows bungee hose 30 in its relaxed state, while FIG. 2B shows bungee hose 30 in its pressurized state. FIG. 2A shows the inlet end of bungee hose 30, while FIG. 2B shows the outlet end of hose 30. Inner elastic tube 34 is inserted within hollow braided outer cover 36. Inlet connector 22 and outlet connector 28 are securely connected to opposite ends of inner elastic tube 34 and outer cover 36. Inlet connector 22 is designed to connect to a pressurized fluid source or compressed gas source. Inlet connector 22 is designed to transfer fluid (liquid or gas) to an interior channel 35 of elastic tube 34. Outlet connector 28 is designed to transfer fluid (liquid or gas) from interior channel 35 to an external nozzle or other device. Outlet connector 28 is connected to inner elastic tube 34 and outer cover 36 on the opposite end from inlet connector 22, and designed to connect to various nozzles or applicator attachments. Outlet connector 28 is designed to direct fluids or gasses within elastic tube 34 to flow past flow restriction ridge 29 and out the end of bungee hose 30 (see FIG. 2B). Flow restriction ridge 29 helps build pressure within elastic tube 34 to extend hose 30 for use.

In FIGS. 2A-B, annular ridges 33 (annular rings) can be part of inner elastic tube 34 or an attached component. Bonding rings 38 are positioned between elastic tube 34 and outer cover 36 and bond the two components together to provide an even distribution of the outer cover along elastic tube 34. This even distribution helps prevent high stress spots in elastic tube 34 when hose 30 is extending due to internal pressure. Both annular ridges 33 and bonding rings 38 (adhesive rings) can be broken into smaller segments or dots to provide the same functions (e.g., holding outer cover 36 in place, so that cover 36 has the proper distribution on elastic tube 34; causing the outer cover 36 to fold in a regular pleated manner by constraining bonded portions of the outer cover 36 to fold inward when the hose 30 is contracted; causing the outer cover 36 to fold in a regular pleated pattern by encouraging portions of the outer cover over an annular ring 33 or other protruding structure to fold outward; etc). Preferably, either ridges 33 or rings 38 are periodically positioned along the length of bungee hose 30 with a spacing of one ring every two feet or closer when the hose 30 is at its Extended Length. In implementations of the disclosed technology in which ridges 33 and/or bonding rings 38 are present, they can be spaced more widely (i.e., separated by more than two feet when the hose 30 is at its Extended Length), but this can reduce the effectiveness of these holding rings at maintaining the position of outer cover 36.

In FIGS. 2A-B, inner elastic tube 34 comprises a tube-shaped body with a plurality of optional annular protrusions along its length. Without protrusions 33, elastic tube 34 can be similar to elastic tubes 24 and 44. Elastic tubes 34 and 44 can be made from any of a number of different elastic materials such as natural rubber, synthetic rubbers, thermal set elastomers, elastic thermal plastics, etc. Many specific polymers and polymer mixtures can exist in each of these elastomer categories. The outside diameter D1 of elastic tube 34 will preferably be chosen so that it gently supports yarns 36a-b on the interior of outer cover 36 when [refracted] *retracted* (e.g., by being slightly smaller than, or approximately the same as, a desired inside diameter of the outer cover 36 when retracted). This gives tube 34 room to slide within outer cover 36 while also providing internal support for outer cover 36 so that the exterior of cover 36 can have a relatively smooth cylindrical shape (e.g., a pleated shape made up of regular valleys and ridges) when retracted. Protrusions 33 are part of elastic tube 34 and comprise annular rings protruding radially outward from the main elastic tube body. Outer cover 36 can deform slightly to accommodate protrusions 33, which helps hold outer cover in place when hose 30 is retracted. Protrusions 33 can also comprise protruding dots or segments instead of complete rings. The protrusions in each case can help reduce stresses on inner elastic tube 34 by resisting shifting of outer cover 36 with respect to elastic tube 34 when hose 30 is retracted and not in use. This holding of outer cover 36 in place with respect to inner elastic tube 34 can also be accomplished with bonding rings 38 that use an adhesive to bond tube 34 and cover 36 together.

As stated previously, in FIGS. 2A-B, protrusions 33 are optional, as are bonding rings 38, and the functions described for those components can be omitted or provided in manners which do not require inclusion of protrusions 33 or bonding rings 38. To illustrate, consider that, instead of (or in addition to) using protrusions 33 and/or bonding rings, an outer cover can be made self adjusting through selection of the elastic tube diameter D1, retracted outer cover diameter D3, and denier of yarns 36a-b. For example, the denier of yarns 36a-b and diameter D3 of outer cover 36 can be selected with respect to the diameter D1 of the elastic hose, so that when hose 30 is retracted, outer cover 36 would tend to form into a longitudinal column of stacked circular pleats (annular ridges 36r and annular valleys 36v) that has an interior surface that fits loosely around inner elastic tube 34. This longitudinal compression of cover 36 would create a small spring like force in the compressed yarns 36a-b that would tend to evenly space out outer cover 36 on tube 34 if shifted out of place by the user. That is, the longitudinal forces in the compressed outer cover 36 will tend to shift outer cover 36 back into place. The selection of smaller denier yarns 36a-b can allow a more compressed position, and thus allow greater expanded to retracted length ratios for hoses 30, 40 and 50.

In FIGS. 2A-B, outer cover 36 can comprise high strength fibers and/or yarns 36a-b that are braided, knitted, woven and/or wrapped into a tube-shaped reinforcement that can support the pressure introduced into inlet connector 22 and inner elastic tube 34 or 44. Yarns 36a and 36b on outer cover 36 are braided in opposite directions in this example, with yarns 36a wrapping around cover 36 in the left-handed direction and yarns 36b wrapping around cover 36 in the right-handed direction. As yarns 36a-b wrap around cover 36 they are woven in and out of each other (braided) to produce a hollow braided structure that can expand and contract both radially and longitudinally because of the pitch angle of yarns 36a-b. The hollow nature of outer cover 36 allows it to accept elastic tubes 34 and 44 into its interior for the assembly of the bungee hose. The braided nature of outer cover 36 can also allow it to create substantially evenly spaced and like-sized annular ridges 36r along its length when retracted, as seen in FIG. 2A. This compressed structure can have nearly tangentially oriented yarns providing outer cover 36 with the ability to stretch or expand longitudinally.

With bungee hose 30 in its retracted position, as seen in FIG. 2A, yarns 36a-b are angled at a small pitch angle P1 of approximately ten degrees. Pitch angle P1 can be modified within a range of approximately five degrees to twenty degrees depending on the needed extension ratio for the bungee hose. For bungee hose 30, this pitch angle P1 is approximately ten degrees relative to the transverse direction of hoses 30. Thus, when in use, outer cover 36 is designed to stretch longitudinally when yarns 36a-b are tilted to various larger pitch angles (see pitch angle P2 in FIGS. 2B-C) and/or as the outer cover 36 unfolds. This increasing pitch angle of yarns 36a-b means that outer cover 36 is expanding longitudinally along with inner elastic tube 34. Because fluid pressure within a hollow cylindrical tube (hose) produces twice the transverse tension (hoop tension) in its skin as it does in the longitudinal direction, the pitch angle of the yarns reach equilibrium around a pitch angle of thirty degrees (Tan(30)=½). Thus, when being extended by internal pressure alone, the pitch angle of yarns 36a-b is likely to stop at an angle slightly below thirty degrees (Extended Length).

When additional tension is added (e.g., as a result of pulling by the user) to bungee hoses 30, 40 or 50, the pitch angle of yarns 36a-b can increase to intermediate pitch angle P2 and beyond. Pitch angle P2 is greater than the pitch angle of approximately 30 degrees which bungee hoses 30, 40 or 50 would achieve when extended by internal pressure alone (i.e., when extended to their Extended Length), but less than the angle such hoses would achieve when extended to their Maximum Stretched Length. The yarns 36a-b can then be held at an intermediate pitch (i.e., when extended to the Fully Extended Length) even after the additional tension is released (e.g., when a user stops pulling) as a result of friction between the yarns 36a-b and the elastic tube 34 and between the yarns 36a-b themselves. For example, prototype hoses have been produced using circular braided tubes for an outer cover 36 made up of yarns having pitch angles of approximately ten degrees when retracted. With a ten degree yarn pitch angle, the prototype hoses were able to expand to a fully extended length of approximately three times their retracted length. Prototypes that had their outer cover compressed even further (even smaller pitch angles from the transverse direction) were able to achieve fully extended lengths greater than four times their retracted length without a stretching force on the hose. When continuously pulled on (stretched) by the user, these prototype hoses easily reached five to six times their retracted lengths during use.

As hose 30 (and hoses 40 and 50) are extended, outer cover 36 tends to go from a larger diameter D3 to a smaller diameter D4. Diameter D4 can be significantly smaller than diameter D3 so that inner elastic tube 34 does not have to expand much radially when pressurized. The angle of yarns 36a-b causes this shrinkage in diameter to happen because of straightening out of the yarns when they are pulled longitudinally. As the pitch angle of yarns 36a-b increases, the diameter of outer cover 36 decreases. With fluid pressure within elastic tube 34, elastic bungee hoses 30, 40 and 50 are easily stretchable by the user simply pulling on the end. This pulling action can further reduce the diameter of outer cover 36 below diameter D4. As outer cover shrinks in diameter, inner elastic tube 34 must also reduce in diameter. Because elastic tube 34 decreases in diameter as the bungee hose is extended, the overall strain within elastic tube 34 is less than if outer cover 36 did not decrease in diameter. Thus, this type of bungee hose can easily reach high expansion ratios without rupturing. Using the disclosed technology, a bungee hose can be implemented which can easily be stretched an additional thirty percent further than its Fully Extended Length simply by being pulled on. This can provide a very stretchable feel, similar to a bungee cord.

In outer cover 36, the denier of the yarn used to form the outer cover influences the ultimate compression ratio in the longitudinal direction, because the yarns can more easily pile up on one another if they are smaller in cross-section. Note that when yarns 36a-b are being compressed in the longitudinal direction, they also tend to expand in the radial direction. During this radial expansion, the radial thickness of outer cover 36 can remain relatively constant for particular ranges of expansion and contraction. As yarns 36a-b are angled closer to the transverse direction (smaller pitch angle), the yarns tend to define a larger diameter on their exterior while at the same time the yarns can define a smaller interior diameter as cover 36 is longitudinally compressed (retracted). In prototype designs, the interior diameter of the outer cover was closely matched with the outside diameter of the inner elastic tube. A small amount of space was left between the inner elastic tube and the pleated outer cover to allow the outer cover to slide freely over the elastic tube. This arrangement provided a well organized and smooth exterior to the prototype hoses when retracted.

Retractable hoses 30, 40 and 50 can have a similar structure with the proper dimensions of outer cover 36, and inner elastic tube 34 or 44. With the correct size of inner elastic tube 34 and outer cover 36, combined with a gentle longitudinal compressive force from the elastic tube (elastic tube 34 length chosen to match compressed length of outer cover 36), then a smooth outer surface can be formed on outer cover 36 with the exterior of elastic tube 34 gently supporting the interior surface of outer cover 36 when retracted. The retracted position seen in FIG. 2A also shows that outer cover 36 can be compressed into evenly spaced and like-sized annular ridges 36r along its length. With the proper combination of diameters and lengths for tube 34 and cover 36, retractable hoses 30, 40 and 50 can have a smooth even exterior that provides a far superior visual appearance compared to prior art retractable hoses. The braided, knitted, woven, and/or wrapped structure of outer cover 36 tends to expand radially when it is longitudinally retracted, and tends to contract radially when the outer cover is longitudinally extended.

In FIG. 2B, we can see that outer cover 36 comprises yarns 36a-b which are braided in and out of each other around a circular path to form the hollow braided reinforcement cover 36. Yarns 36a progress through outer cover 36 in a left handed spiral path while yarns 36b progress along a right handed spiral path. In FIG. 2A, these individual yarns are compressed longitudinally causing all the yarns to be angled nearly vertically (five to twenty degrees from vertical, pitch angle). Preferably, in an implementation following FIG. 2A, the braided yarns 36a-b in outer cover 36 can form evenly spaced annular ridges 36r along the outer surface of retractable bungee hoses 30, 40 and 50 when retracted. Yarns 36a-b will preferably be made from a strong material, such as polypropylene, nylon, polyester, cotton, etc. Yarns 36a-b can comprise many strands of material or a single strand filament. Multi-strand yarns can be twisted and untwisted yarns, multiple multi-strand yarns, etc. Yarns 36a-b can also comprise flat strips, textured strips, and other strands of various cross-section, etc. Different yarn types will produce different outer covers with different properties for specific uses. For example, yarns 36a-b might comprise a thin rectangular cross-section monofilament, or large denier untwisted multi filament yarns. Both can be woven into a bungee cord like patterns to make outer cover 36. This gives the retracted hose seen in FIG. 2A a clean smooth appearance.

In the extended position seen in FIGS. 2B and 2C, outer cover 36 is extended longitudinally and individual yarns can be seen angled at nearly at forty-five degrees from the transverse direction (perpendicular to the longitudinal axis of the hose). The yarns wrap in both directions and weave in and out of each other to provide a stable tubular shaped reinforcement that can expand and contract longitudinally and radially. The construction of outer cover 36 can be very similar to a Chinese finger tube where one can insert a finger in each end of the toy which longitudinally compresses the toy and expands it radially so the user's fingers slide inside the tube. When the user tries to pull their fingers out they stretch the braided structure of the tube causing it to tighten radially on their fingers. The bungee hoses disclosed here can be implemented to function similarly but with elastic tubes 34 and 44 having the ability to change diameter more easily than a person's fingers. Thus, bungee hoses 30, 40 and 50 can stretch and contract lengthwise in response to tension and pressure on the hose.

In FIGS. 2A-B, lubricant 37 is coated on the interior surface of outer cover 36. Lubricant 37 can be coated on the interior of outer cover 36 before elastic tube 34 is inserted and connectors 22 or 28 are connected to their ends. Lubricant 37 can be infused though outer cover 36 to coat elastic tube 34 and the interior surfaces of outer cover 36. Lubricant 37 is designed to reduce friction and wear on elastic tube 34 as the elastic tube slides within cover 36 during extension and retraction of hose 30. Care should be taken during assembly so that lubricant 37 is not scraped all to one end of retractable bungee hose 30. An even coating of lubricant 37 will preferably be provided along the full length of hose 30. Lubricant 37 can be applied to elastic tube 34 before assembly. Various solid and liquid lubricants can be used to reduce friction between elastic tube 34 and outer cover 36. Because of the porous nature of outer cover 36, lubricant placed on outer cover 36 is less likely to be scraped off or shifted within retractable hose 30 during assembly. Many other methods of applying the lubricant can be used to get the lubricant between elastic tube 34 and outer cover 36. The fibrous nature of outer cover 36 tends to keep the lubricant from being dispersed into the environment.

In FIG. 2C, we see a second example of a elastic retractable stretch hose 40 (bungee hose), comprising an inlet connector 22, a stretchable outer cover 36, an inner elastic tube 44, a second stretchable reinforced middle cover 46, a plurality of optional bonding rings 48, and an outlet connector 28. Inlet connector 22, outer cover 36 and outlet connector 28 can be the same as seen in bungee hose 30 and perform the same operational functions. Bungee hose 40 however, also includes a second stretchable middle cover 46 placed between elastic tube 44 and outer cover 36. Middle cover 46 can have substantially the same structure as outer cover 36 and be made of similar yarn material. In some designs, middle cover 46 might be made of cotton to provide a soft low-friction surface for elastic tube 44 to rest against when inflated. If middle cover 46 is made with a significantly finer denier yarn than outer cover 36, it can have a tighter braided pattern as shown, which can provide a smoother interior surface for contact with elastic tube 44. Outer cover 36, middle cover 46 and elastic tube 44 are inserted one inside the other to form a three layer hose, with connector 22 and 28 bonded to all three layers on the inlet and outlet ends, respectively of bungee hose 40.

In FIG. 2C, middle cover 46 is drawn with approximately twice as many yarns as outer cover 36, and can have approximately half the radial thickness of outer cover 36 because of the smaller denier yarns used. The pitch angle of yarns 36a-b in cover 36 and yarns 46a-b making up cover 46 can have substantially the same pitch angle at all lengths of the hose (though with different angles at different lengths) to help insure a smooth transition between the retracted and extended positions, and between the extended and retracted positions. However, the smaller denier of yarns 46a-b of middle cover 46 can have a significantly smaller pitch angle if desired because of the greater compression that can be achieved with smaller diameter yarns 46a-b (or fibers). Yarns 46a-b are shown in FIG. 2C with a pitch angle of about thirty degrees, which means they are near their fully extended length, while yarns 36a-b of outer cover 36 are shown with a pitch angle of about forty-five degrees, which means it has been stretched well past its equilibrium length (Extended Length, near thirty degree pitch angle). In alternate designs, many other combinations of pitch angles and yarn denier can be used for the reinforcement covers 36 and 46 and can be used to provide the desired bungee hose properties.

In FIG. 2C, pitch angle of yarns 46a-b of middle cover 46 at about thirty degrees, while yarns 36a-b in outer cover 36 are at approximately forty-five degrees. This difference in pitch means that the middle cover 46 is just reaching equilibrium between radial and longitudinal tensions while outer cover 36 would be resisting this extended length. Thus, covers 36 and 46 could be fighting each other in the direction they want to change length from internal fluid pressure. However, if the inside diameter of outer cover 36 is slightly larger than the outside diameter of middle cover 46 at a particular length, then most of the radial and longitudinal forces will be carried by middle cover 46 not outer cover 36. Instead outer cover 36 could rest loosely around middle cover 46 and provide wear protection for cover 46. This can allow bungee hose 40 to have a significantly longer fully extended length than the pitch angle on outer cover 36 would suggest. Middle cover 46 could extend to its extended length (yarn pitch angle approximately thirty degrees) and also extend outer cover 36 to the same length. Because very little radial force is exerted on outer cover 36, the longitudinal extension created by middle cover 46 also extends cover 36, and its yarns 36a-b can be pushed past their equilibrium pitch angle of approximately thirty degrees.

In FIG. 2C, outer cover 36 is shown bonded to middle cover 46 by bonding rings 48. These bonding rings 48 are optional and need not be used in any specific bungee hose design. However, when used, bonding rings 48 will preferably lock covers 36 and 46 together at periodic points. Also, bonding rings similar to bonding rings 38 can be used to bond elastic tube 44 to middle cover 46 if desired. The width of these bonding rings can be relatively narrow so that elastic hose 44 is free to stretch longitudinally. Because elastic tube 44 can stretch both radially and longitudinally, bonding rings 38 and 48 can be made of an elastomer adhesive so that they can stretch with the elastic tube. In alternate designs, bonding rings 38 and 48 can comprise an elastomer ring with adhesives on its inner and outer surfaces. These adhesives on the interior and exterior of the elastomer rings do not have to be the same and can be specifically tailored to bond to the surface it is going to be attached to.

In FIGS. 3A, and 3B, we see elastic retractable stretch hose 50 (bungee hose) comprising an inlet connector 22, an inner elastic tube 44, a stretchable reinforced outer cover 36, an outlet connector 28, and one or more wear resistant rings 39 for protecting outer cover 36 from wear against external surfaces such as the ground, and/or other functions such as controlling contraction of the hose 50 as described herein. Connector ends 22 and 28, and outer cover 36 can be substantially the same as previously seen in bungee hoses 30 and 40. Inner elastic inner tube 44 can be constructed similar to the other inner elastic tubes seen in this patent, but is shown here with a simple tubular shape without protrusions or bonding zones. Wear rings 39 can comprise a polymer ring bonded securely to the outer surface of cover 36. The polymer material that makes up rings 39 can be made of either hard or soft polymers to provide wear protection. If wear rings 39 comprise an elastic polymer then rings 39 can stretch and shrink in diameter with cover 36 as hose 50 is stretched and relaxed. If a harder polymer is used, such as polypropylene, a thinner coating (thin radial thickness) and/or sporadic thicker portions can be used to allow rings 39 to flex during extension and retraction.

FIG. 3A shows bungee hose 50 in its relaxed state, while FIG. 3B shows bungee hose 50 in its pressurized and extended state Inner elastic tube 34 is inserted within hollow braided outer cover 36. Inlet connector 22 and outlet connector 28 are securely connected to opposite ends of inner elastic tube 34 and outer cover 36. Inlet connector 22 is designed to connect to a pressurized fluid source or compressed gas source and then transfer that fluid (liquid or gas) to an interior channel 35 of elastic tube 34. Elastic tube 44 can comprise any of a number of elastic materials, such as latex rubber, thermal plastic urethane, synthetic rubbers, thermal set elastomers, thermal plastic elastomers and other elastic materials. Outer cover 36 can be the same as discussed previously and can comprise a high-strength braided tube that can fold into radial pleats to provide a large extended-to-retracted length ratio. Wear resistant rings 39 can comprise a wear resistant elastomer or other wear resistant polymers that can bond to the outer surface of cover 36 on exterior ridges 36r of the refracted outer cover.

Wear rings 39 can provide dimensional stability to hose 50 which tends to return outer cover 36 to the same retracted configuration when pressurized and depressurized over and over again (e.g., if the combined length of the wear rings 39 is greater than the length the hose 50 would take when depressurized in the absence of the rings, then the combined length of the rings can place a limit on the hose's ability to retract, and the outer surfaces could, when the hose 50 is at its retracted length, provide an unbroken barrier between the outer cover 36 of the hose 50 and the surrounding environment). When hose 50 is extended, wear rings 39 protrude outward away from the surface of outer cover 36 to protect cover 36 from wear against surfaces such as pool decks, driveways, sidewalks, etc. Outlet connector 28 is designed to transfer fluid (liquid or gas) from interior channel 35 to an external nozzle or other device that provides a restriction to the flow of fluid through hose 50. Outlet connector 28 is connected to inner elastic tube 34 and outer cover 36 on the opposite end from inlet connector 22, and can be designed to connect to various nozzles or applicator attachments. Outlet connector 28 can be designed with a flow restriction ridge 29 to restrict fluid flow (gas or liquid) out of hose 50 and helps build pressure within elastic tube 34 to extend hose 50 for use.

In FIG. 3B, notice that wear rings 39 protrude outward from cover 36, both when bungee hose 50 is retracted and when it is extended. This provides the wear rings with first contact with most flat surfaces to protect the softer yarn that is comprised by outer cover 36. The natural outside diameter D1 of elastic tube 44 will preferably be chosen so that it gently supports outer cover 36 on the interior when refracted. This gives tube 44 room to slide within outer cover 36 while also providing internal support for outer cover 36. This allows the exterior of cover 36 to have a relatively organized cylindrical shape when retracted. Wear rings 39 tend to provide support for the outer ridge of cover 36 to maintain a diameter D3 when retracted, which is significantly larger [that] *than* the operational diameter D4 of bungee hose 50 (see FIG. 3B). The size of diameter D4 can change depending on how much longitudinal tension is placed on the bungee hose. As hose 50 is stretched, the outside diameter D4 of cover 36 gets smaller, and as that stretching force is released, bungee hose 50 *will* tend to increase in diameter back to diameter D4. If rings 39 are made of an elastic material, then rings 39 will also tend to spring back out from their smaller compressed diameter (seen in FIG. 3B) to their larger stowed diameter (seen in FIG. 3A). This elastic expansion outward of rings 39 helps ensure the folding of cover 36 is controlled so that the same pleated structure is formed properly each time the hose is retracted. Finally the reader should understand that lubrication 37 (film, layer or coating), ridges 33, adhesive strips 38 and other structures disclosed in this patent can be combined and used with bungee hose 50.

Pleated outer cover 36 can also be used as a bungee cord cover to allow [the elastic cords] *an inner elastic core* inside to be stretched more than six times [their] *its* original length. In FIGS. [4A-B] *4A-C*, we see bungee style tie-downs developed by the inventor for use in tying or securing items for travel. Prior to the development of the longitudinally pleated braid, *conventional* Bungee Cords were limited to approximately 2× (two times their retracted length). Now with the longitudinally pleated braid, 6× or more expansion is possible for a bungee style tie-down. This allows a one-foot long elastic [cord] *core, incorporating an outer cover* made with the disclosed longitudinal pleating technology, to *operate as a bungee cord and* stretch up to six feet to tie down items [like a bungee cord]. Various types of inner elastic core can be used in this type of implementation, and FIG. 4A shows the elastic core provided by elastic hose 34, and FIG. 4B shows the elastic core provided by *a* solid elastic cord [44] *64*. [In alternate designs, solid elastic cord 44 can be replaced with] *FIG. 4C shows the elastic core provided by* multiple smaller elastic cords *67* as is common practice in bungee style cord manufacturing.

In FIGS. [4A-B] *4A-C*, we see bungee cords 60 and 63 *and 65* using pleated cover 36 to obtain a high stretched-to-retracted length ratio. Bungee cord 60 comprises previously discussed elastic tube 34 and pleated braided cover 36. Both elastic tube 34 and braided cover 36 are attached to bungee cord hook end 62 at one end and attached to a similar hook end at their other ends. Ribs 33 and lubricant 37 are optional. Bungee cord 63 comprises previously discussed pleated braided cover 36 and a solid core elastic [band] *cord* 64. Bungee cord hook end 62 is attached to one end of both braided cover 36 and elastic [band] *cord* 64 and a second hook end (not shown) similar to hook end 62 is attached to the other ends of braided cover 36 and elastic [band] *cord* 64. *Bungee cord 65 comprises previously discussed pleated braided cover 36 and a plurality of elastic cords 67 positioned within the breaded cover 36. Bungee cord hook end 62 is attached to one end of both braided cover 36 and elastic cords 67 and a second hook end (not shown) similar to hook end 62 is attached to the other ends of braided cover 36 and elastic cords 67.*

In FIGS. [4A-B] *4A-C*, we see [two] *three* bungee cords 60 and 63[, respectively] *and 65* comprising hook ends 62, a pleated outer cover 36 and an elastic core comprising [either] elastic [hose] *tube* 34 [or], solid [core] *elastic cord* 64, *and a plurality of elastic cords 67,* respectively. In FIG. 4A, bungee cord 60 is seen comprising the hose portion of elastic retractable hose 30 (see FIGS. 1A-B) with hose ends 22 and 28 replaced with bungee cord ends 62. Ridges 33, lubricant 37 and bonding rings 38 are optional for the functional operation of bungee cord 60. The use of pleats in braided cover 36 allows a substantially greater retraction ratio for outer cover 36 when compared to prior art braided bungee cord covers. With a pleated outer cover like cover 36, bungee cords can have extension ratios of six-to-one (600% of original length).

In FIG. 4B, bungee cord 63 is very similar to bungee cord 60 except it uses a solid [core] elastic *cord* 64. While solid core elastics are used for bungee cords, more often multiple strands of elastic, *such as the plurality of elastic cords 67 shown in FIG. 4C,* are used with braided outer covers to provide a more reliable bungee cord. [The single strand cord 64 is shown here in FIG. 4B because it is easier to draw than a typical multi-strand bungee cord core that might comprise dozens of longitudinal elastic strands.] The reader should understand that the same braiding processes used to make a single cord pleated cover bungee cord can also be used to make multi-strand elastic bungee cord. Ends 62 can be the same on both ends of the bungee cords, or modified for specific purposes. Multiple types and styles of bungee cord ends can be seen in the prior art and nearly any type or style of bungee cord ends can be attached and used with this pleated cover style of bungee cord.

In FIGS. [4A-B] *4A-C*, pleat ridges 36r have been heat set into the outer cover 36 so that it tends to form the annular pleats as shown when retracted. Setting the shape of the pleats can contribute to the stable operation of pleated braided cover 36. In embodiments where the pleats' valleys 36v and/or ridges 36r are not stabilized on cover 36, the pleated cover can be at greater risk of losing its orderly shape and not retracting properly. Several methods can be used to stabilize the pleats, such as: 1) bonding a polymer material to fibers and/or yarns 36a-b at ridges 36r on cover 36 (see FIGS. 3A-B), 2) heat setting fibers and/or yarns 36a-b with high temperature air, 3) heat setting fibers and/or yarns 36a-b with an open flame, 4) heat setting fibers and/or yarns 36a-b with a hot surface (iron), 5) heat set fibers and/or yarns 36a-b with radiant heat (infrared, light, etc.), 6) heat setting fibers and/or yarns 36a-b with steam and 7) heat setting fibers and/or yarns 36a-b with other less common heating methods. More than one of these stabilizing methods can be used together on a single cover. For example, high temperature air might be used together with infrared heaters to achieve the desired pleat set. Similarly, high temperature air might be used to set the pleats and then a polymer coating applied to the ridges to further stabilize the pleats for long term use.

In FIG. 5A, elastic hose 70 can be substantially the same as extendible and retractable hose 30 seen previously, but with the heat set comprising a plurality of melted surface portions 77 on ridges 36r of cover 36. In FIG. 5A, pleated outer cover 36 as discussed previously (see right side of FIG. 5A), is in the process of being transformed into heat set pleated outer cover 76 (see left-side of FIG. 5A). Open flames 71 coming from multiple burner nozzles 72 are used for heat setting the shown annular pleated portions 77 into braided cover 36 and forming heat set braided cover 76. Burner nozzles 72 can be placed completely around the cover 36 (only top and bottom burner nozzles 72 shown) so that heat is evenly dispersed across the surface of ridges 36r on the cover 36. In this example, annularly pleated braided cover 36 is moving passed burner nozzles 72 from right to left, with cover 36 slightly extended from its fully retracted position so that ridges 36r are not strongly forced together by elastic tube 34. Burner nozzles 72 can use various fuels to produce flames 71, such as, propane, butane, methane, ethanol, methanol and other gaseous and liquid fuels that can produce a stable flame 71. The plurality of melted surface portions 77 are formed as exposed surfaces of braided cover 36 pass through burner nozzles 72 and flames 71. The flames can heat those exposed exterior surfaces to the melting point of the material comprising cover 36 (i.e., polypropylene, nylon, polyester, polyethylene, etc.) melting yarns 36a-b together to form portions 77 on heat set pleated braid 76.

As the burner nozzles 72 direct their flames 71 across the outer surface of pleated cover 36, the intense heat from the high temperature flames 71, may require only a fraction of a second to melt the outer surface of ridges 36r and form the plurality of melted surfaces 77 on the exposed portions of yarns 36a-b. During this melting process, the interior portions of pleated braided cover 36 can remain relatively cool compared to ridges 36r. Braided cover 36 can be slightly extended longitudinally from its fully compressed (fully retracted) position during the melting process so that ridges 36r do not significantly touch their neighbors on either side. With cover 36 slightly longitudinally extended in this way, flames 71 tend to cool quickly as they passes through the narrow gap between pleats (between ridges 36r) and tend not to provide sufficient heat to bond the sides of the pleats together where the pleats might be lightly touching each other.

Each of the yarns 36a-b can comprise many individual filaments that can be twisted together or untwisted. In FIG. 5A, this melting and partial bonding of yarns 36a-b can take place primarily between these smaller filaments within individual yarns 36a-b. Thus, with the correct amount of heating, the exposed surfaces of yarns 36a-b may melt their yarn filaments together forming a plurality of hard surface shells 77 on the surface of yarns 36a-b at ridges 36r. These surface shells or melted zones 77 can form on a particular yarn, and may or may not be bonded strongly to their neighboring surface shells 77 on another yarn. This weak bonding between adjacent surface shells allows braided cover 76 to remain relatively flexible even though the outer surface of the ridges are heavily melted. This melting of the yarn surfaces prevents yarns 36a-b from sliding too far from their original pleated positions during use, and thus provides a stable pleated braid that can hold its shape even after heavy use.

In FIG. 5B, we see elastic hose 70 pressurized and extended for use with cover 76 and elastic tube 34 taking on a cylindrical hose shape. Hose 70 comprises substantially the same structure as hose 30, but also defines a plurality of melted portions 77 forming annular rings spaced evenly along the length of hose 70. Melted portions 77 tend to resist forming a perfect cylinder with the rest of pleated cover 76 and tends to return to their pleated ridge positions when hose 70 is depressurized and returned to its longitudinally retracted position for storage. If braided cover 76 with melted ridge portions 77 where installed on bungee cords 60 [or], 63 *or 65* (replacing cover 36), melted portions 77 would function substantially the same way as they do in elastic hose 70 and tend to return ridges 36r to their original retracted positions after cover 76 was stretched for use.

Adhesives

As the reader should understand from the previous discussions, the use of bonding agents, bonding structures, and adhesives for bonding specific components of the disclosed bungee pressure hoses together can be useful for a hose's proper operation and durability. However, the composition of these bonding materials, and the positioning, shaping and applying of the bonding structures can vary greatly. For example, the bonding structures (bonding rings 38) used to bond inner elastic tube 34 to outer cover 36 can take the form of bonding strips that follow a spiral path, small segments (short strips), or small dots that are periodically positioned along the hose, or even random patterns of bonding patches or pads (not shown, see bonding rings 38 and 48 if segmented). During manufacturing, these bonding structures and/or adhesives can be first applied to the inner elastic tube, or outer cover, and/or to additional components to form structures such as bonding rings 38, bonding rings 48, bonding pads (not shown), or bonding dots (not shown). The bonding materials can also be applied before, during or after the construction of particular parts of the retractable hose. Further, the bonding structures can also be applied in a non-adhesive state to the inner elastic tube, and/or outer cover and then later, after assembly, be activated to bond these components together to complete the retractable hose. The bonding agents themselves (plus any support structures) can comprise a very diverse set of materials, including, but are not limited to, adhesives, polymer adhesives, UV cured adhesives, thermally cured adhesives, chemically cured adhesives, flexible thermal polymers, soft elastomers, foamed polymers and/or elastomers, etc. Finally, the bonding structures and bonding agents can comprise the actual hose structure itself, in which case, no additional bonding structures or adhesives are needed (e.g., linear elastic tube is thermally and/or mechanically bonded to the outer cover).

Inner Elastic Tube Construction

In FIGS. 1A through 3B and 5A through 5B, elastic tubes 24, 34, and 44 can be made of an elastic material (elastomer) formed into a tube shape for transporting a fluid or gas. Elastic tubes 34 and 44 can have the same structure as elastic tube 24 if desired Inner elastic tubes 24, 34, and 44 are shown with significant elastic properties that can allow them to stretch up to seven times their original length when placed under stress. The wall thickness and diameters of elastic tubes 34 and 44 can be varied in relationship to outer cover 36 to provide the desired operation (extending and retracting) of the retractable hose. The elastic material used to make tubes 34 and 44 can be the same elastic material used in prior art elastic tube 24 and can comprise any of a number of presently available elastomers, rubbers, and other materials with elastic properties. Elastic tubes 34 and 44 can be made from material including, but is not limited to, natural latex, synthetic latex, thermal set plastics, thermal set elastomers, thermal plastic elastomers, thermal plastic urethane, butylene rubber, etc. The specific elastomer used will depend on the specific use for that particular hose and its particular operational environment. The extension ratio of the elastomer from its natural length will depend on the particular use of the retractable hose. For use as a garden hose, a stretch of three hundred percent (3×) or more is desirable. Thermal set polymer materials have a big advantage over thermal plastics because they tend to return to the same shape they started even after being stretched for long periods of time or experiencing higher temperature. Thus, the low creep of thermal set plastics allows a longer useful life of the disclosed elastically retractable hoses. Thermal plastic elastomers tend to lose a significant portion of their elasticity when stretched and heated and may not return to their original retracted length.

Manufacturing Methods—FIGS. 1A through 5B

In FIGS. 1A-B we see prior art elastic-biased stretch hose 20 (retractable hose), which can be manufactured in a number of ways. For example, elastic tube 24 and outer cover 26 can be made separately with elastic tube 24 then being slid inside cover 26 and connectors 22 and 28 being bonded to each of their ends. Alternatively, elastic tube 24 can be made separately and outer cover 26 woven around elastic tube 24 to form the hose section. Elastic tube 24 defines an interior channel 25 for conveying fluids or gases entering through inlet connector 22 and exiting through outlet connector 28 seen in FIG. 1B. Retractable hose 20 can include a flow restricting ridge 29 as seen on outlet connector 28. Since the natural length of outer cover 26 is considerably longer than the natural length of inner elastic tube 24, outer cover 26 will be longitudinally compressed when hose 20 is collapsed, and elastic tube 24 will be longitudinally stretched to the length of outer cover 26 when extended. A mandrel system can be used to facilitate these assembly processes.

In FIGS. 2A through 3B, woven outer cover 36, and inner elastic tubes 34 and 44 are used in retractable hoses 30, 40 and 50, which can be assembled similar to above described stretch hose 20. Other methods are possible, where reinforcement outer cover 36 can be braided directly onto elastic tube 34 which is made separately. Lubricant 37 can be coated onto the exterior of elastic tube 34 and/or interior surface of outer cover 36 before elastic tube 34 is pulled through interior channel passageway 35 of cover 36. Inlet connector 22 and outlet connector 28 can then be connected to each end of elastic tube 34 and outer cover 36. The introduction of lubricant 37 between elastic tube 34 and cover 36 reduces the friction between their surfaces and provides smaller friction forces and less wear on elastic tube 34.

In FIGS. 3A and 3B, wear rings 39 can be formed on the ridges of braided outer cover 36 by a number of methods. A few of these methods include spraying on a liquid polymer while cover 36 is retracted and then quickly partially extending the cover longitudinally to separate the liquid into rings, rolling outer cover 36 in a hot polymer bath to coat the ridges and separating into rings, rolling hot polymer onto outer cover 36 to form rings 39, extruding wear rings 39 onto the ridges of outer cover 36, while cover 36 is fully retracted coating the entire exterior of cover with a wear resistant polymer which is then cut between ridges to form rings 39, etc.

Lubricant 37 can be a liquid lubricant, a solid lubricant, and/or a mixture of solid and liquid lubricants. Solid polymer powders or small beads can also be used as a solid lubricant. Some lubricant examples include, but are not limited to oils, paraffin wax, wax mixtures, other soft polymers, Teflon, graphite, solid polymer coatings, elastomer coatings, etc. These lubricants 37 can be coated on the interior of outer cover 36, on the fibers of outer cover 36, and/or on the exterior of inner elastic tubes 24, 34, and 44. Liquid lubricants can be applied from the exterior through outer cover 36 to coat the inside surface of cover 36 because of the porous nature of outer cover. Solid lubricants, like paraffin wax, that can be melted, can also be applied to the exterior of outer cover 36 and allowed to wick through the fabric of cover 36 and/or be forced through cover 36 to its interior surface by a number of methods (e.g., application of a compressed gas).

Of the lubricants tested so far, paraffin candle wax has worked the best. The soft solid nature of paraffin provides a smooth lubrication between the two surfaces, and does not wash away or drain away during use, nor while not in use. Wax also easily wicks into the fabric of cover 36 when heated to its melting point. Wax and other lubricating polymers can also continue to provide protection even after hundreds of hose extension and retraction cycles. Waxes may also be combined with other ingredients or additives to make the wax have various other properties. By adding additional ingredients or additives, a wax or soft polymer can be made sticky and/or gooey so that it can shift with the inner elastic tube and/or outer cover, while at the same time help hold the inner hose in a particular position when the hose is retracted. These sticky and/or gooey polymers can operate as a weak adhesive, providing weak bonding between the elastic tube and outer cover to maintain their relative position during operation. These sticky and gooey polymers can be tailored to slide easily when a small constant force is applied (acting like a thick lubricant) while at the same time resisting strong fast forces to act like an adhesive. Other additives might be used to increase the melting temperature (warmer climates) of the wax or soft polymer, and in other situations be used to reduce the melting temperature (colder climates). Other lubricating solid polymers can comprise polymers that can be bonded to the fibers of outer cover 36 and also make a low friction contact interface with the outer surface of the elastic tubes (i.e., elastic tubes 24, 34, and 44). The lubricant may also comprise a solid lubricant that is coated on the yarn or fibers that make up outer cover 36 before outer cover 36 is woven or braided.

Pleated covers 36 and 76 can be manufactured by first braiding a round braid tube with a circular braiding machine, or other similar machine, then pleating the braided tube with repeating annular pleats and the setting the shown pleated shapes by heat setting, coating with polymers, and/or using other shape holding methods. Once, pleated covers 36 and 76 have a set shape, as shown in FIGS. 2A, 3A, 4A, and 5A, then elastic materials of various kinds can be inserted into the covers and attached to their appropriate end connectors to form retractable hoses (i.e., 30, 40 and 70) or bungee cords (i.e., 60 [and], 63 *and 65*). A special method of heat setting cover 36 is shown in FIG. 5A, where outer ridges 36r are seared by open flame to partially melt yarns 36a-b and form pleated cover 76. The melted portions 77 provide a means for holding yarns 36a-b in place with respect to each other and provide a robust ability for the yarns to return to their original pleated shape as seen in FIG. 5A after being repeatedly extended for use (see FIG. 5B).

The manufacturing of pleated outer cover 76 seen in FIGS. 5A-B can be accomplished in several ways. One method is shown in FIG. 5A, where a finished hose similar to extendible and retractable hose 30 is passed through a burner chamber comprising burner nozzles 72 such that flames 71 contact the outer ridge surfaces 36r of cover 36 heating these surfaces to the melting point of yarns 36a-b. Protective covers can be placed over hose ends 22 and 28 if they are made of plastic, so that these ends are not damaged as the hose passes through flames 71 and multiple melted portions 77 are created on ridges 36r. A second method of producing pleated outer cover 76 can be to send only pleated cover 36 through a burner chamber comprising burner nozzles 72 with flames 71 to produce melted portions 77. Both these above methods can substitute a high temperature heated air and/or radiant heaters (IR and visible-light heaters) for burner nozzles 72 as the heat source.

In tests, a very-high temperature heat gun, produced sufficiently hot air, at greater than 1400 degrees Fahrenheit, and radiant heat to produce melted portions 77, on a pleated cover similar to cover 36, that were nearly indistinguishable from melted portions 77 produced by a propane flame. In some designs quickly heating the exterior of cover 36 is important to properly melting of portions 77 without heating and shrinking the valley portions of the cover. Slower heating can cause excessive heating of underlying portions of pleated cover 36 which can tend to cause yarns 36a-b (and cover 36) to shrink significantly and can also make the resulting pleated braid stiff. Thus, heating of portions 77 can be done quickly to prevent shrinkage of fibers 36a-b. Heated air, and burned gasses, cool quickly as they pass between the small closely-packed fibers of cover 36, but if heat is applied for more than about one-half a second, the heat begins to penetrate deeper into cover 36 and starts to cause the interior portions of the fibers to begin to shrink. When this interior shrinkage happens there is nothing to support the outer ridges and the entire cover 36 tends to shrink in diameter. This shrinkage can cause problems if the shrinkage of cover 36 was not taken into account for the final product. Ideally, only the outer ridge is heated sufficiently for the fibers to shrink and/or melt so that the underlying fibers can support the outer ridge and help resist the shrinkage of fibers there. For pleated braid about 0.80 inches in outside diameter, the dwell time for the heated air or gasses should kept below one second to prevent significant shrinkage. Ideally for most nylons and polyesters heating times under one-half second can be used to keep shrinkage minimal. However, temperatures should be high enough to melt the outer ridge and form melted portions 77 during this one-half second or less of heat. This can require relatively high temperatures above about 1500 degrees Fahrenheit. Thus, in many cases the heating of melted portions 77 should be done very quickly before hot gasses, flame, or radiant heat have time to penetrate deeper into braided cover 36 and cause excessive shrinkage.

In FIGS. 5A-B, melted portions 77, because of their hardened nature, have the ability to hinder the normal changes in response to extension forces of the pitch angle of the fibers at those locations. Thus, when measuring the pitch angle of fibers 36a-b, measurements should be taken between the rings formed by melted portions 77 where fibers 36a-b are undamaged and unimpeded by melted fibers.

Operational Description—FIGS. 1A through 3B

In FIGS. 1A-B, prior art retractable hose 20 is seen with inner elastic tube 24, which has a relatively thick wall to provide strength to resist water pressure and resist friction against outer cover 26. The outside diameter D1 of elastic tube 24 is approximately half the diameter D2 of outer cover 26 so that elastic tube 24 does not begin to press significantly against the interior surface of outer cover 26 until considerable internal pressure is already applied. The smaller diameter D1 of elastic tube 24 also allows retractable hose 20 to extended significantly in the longitudinal direction before expanding to the diameter D2 (inside surface of cover 26, see FIG. 1B). This prevents significant friction from forming between elastic tube 24 and outer cover 26 until after retractable hose 20 is partially extended. Restriction 29 produces a back pressure within elastic tube 24 to increase internal pressure and extend the hose fully. Nozzle accessories (not shown) which can be attached to outlet connector 28 can provide additional back pressure to extend hose 20. As pressure increases within elastic tube 24, tube 24 presses up against folded portions of outer cover 26 and the hose continues to expand longitudinally. As pressure further increases, elastic tube 24 presses up against the interior surface of outer cover 26 which can cause outer cover 26 to form creases and not reach its full length without cover 26 sliding across the surface of elastic tube 24 to reach its full length. This sliding of surfaces creates wear and reduces the useful life of the hose. When water pressure is removed, the elastic biasing tension in elastic tube 24 causes retractable hose 20 to retract and force the water out of elastic tube 24.

Before we go further in the discussion of bungee hoses 30, 40 and 50 please review the section marked "Definition of Terms" in this document for the definition of a few special terms used in describing bungee hoses. In FIGS. 2A-B, retractable hose 30 is seen in its collapsed and extended states, respectively. In its collapsed state, as seen in FIG. 2A, elastic tube 34 is substantially relaxed with cover 36 folded and compressed longitudinally around tube 34. A retractable hose can be manufactured so that outer cover 36, when in this refracted position, will tend to fold and compress (pleat) into evenly spaced and like-sized annular ridges 36r along its length. For example shaping the outer cover 36 into the desired pleated pattern, then heat pressing it to set the pleated shape into the yarn fibers (either in combination with, or as an alternative to, other approaches described herein for achieving the described pleated pattern, such as designing the inner hose to have an outer diameter in its retracted state which gently supports the valleys in the pleated shape to be taken by the outer cover). In a stretched state, as seen in FIG. 2B, outer cover 36 and inner elastic tube 34 is shown stretched by a user to a length for retractable hose 30 that is beyond its "fully extended length" (see definitions section). The nature of outer cover 36 can provide it with the ability to substantially fold evenly into tightly packed, evenly spaced, and like-sized annular ridges as it is longitudinally compressed (retracted) to provide a relatively smooth and even outer surface that is esthetically pleasing. Some portions of yarns 36a-b tend to fold inward to form valleys 36v and some portions tend to fold outward to form exterior ridges 36r. A properly designed hollow circular braid can form evenly spaced points on outer cover 36 that wants to fold in or out naturally, and thus outer cover 36 can be designed to collapse evenly in a corrugated pattern around elastic tubes 34 and 44 without additional structures. The addition of wear resistant rings 39 as seen in FIGS. 3A-B can further force the outer cover to take on this pleated or corrugated shape when retracted.

In FIGS. 2A-B, as water pressure is introduced into connector 22 and inner channel 35, elastic tube 34 begins to expand longitudinally and radially. The interior of outer cover 36 is easily deformed and begins to take on a cylindrical shape. As pressure increases, elastic tube 34 begins to press against outer cover 36, and eventually straightens outer cover 36 into a cylindrical shape tube. As elastic tube 34 is forced against outer cover 36, lubricant layer 37 helps reduce friction and chaffing of elastic tube 34 on outer cover 36. Once inner elastic tubes 34 and 44 have pressed outer cover 36 into a cylindrical shape, elastic tube 34 and outer cover 36 can then expand together as bungee hoses 30, 40 and 50 continue to extend lengthwise as internal pressure increases. Outer cover 36 can smooth-out and lay flat against inner elastic tube 34 long before the bungee hose reaches its extended length. As more pressure is applied, bungee hoses 30, 40 and 50 continue to lengthen as outer cover 36 continues growing longitudinally with inner elastic tubes 34 and 44, respectively. Once full contact is made between tube 34 and cover 36, further extension of elastic tube 34 and outer cover 36 produces very little sliding of tube 34 with respect to outer cover 36. However, lubricant 37 can provide a low friction surface interface between tube 34 and cover 36 to slide allow them to slide with respect to each other. Lubricant 37 can help reduce wear of elastic tube 34 as it slides with respect to cover 36 by reducing stresses on tube 34. Solid lubricants such as paraffin wax are particularly good at reducing wear and also reducing friction between elastic tube 34 and a woven outer cover 36. The wax tends to remain within cover 36 during long term use and in tests actually appears to work better and better as the wax is worked into the fibers of cover 36.

In FIG. 2C, bungee hose 40 can operate in substantially the same way that retractable bungee hose 30 operates. The addition of a middle cover 46 can change the "extended length" of bungee hose 40 compared to bungee hose 30, but would still expand and contract with elastic tube 44 similar to bungee hose 30. Lubrication 37 (film, layer or coating) is not used here because a reinforcement middle cover 46, similar to outer cover 36, is positioned between outer cover 36 and elastic tube 44. Middle cover 46 can provide a softer contact surface for elastic tube 44 to reduce friction. Middle cover 46 can also be impregnated with a lubricant before assembly to provide additional wear protection for the elastic tube. Reinforcement covers 36 and 46 can be designed to expand and contract together such that outer cover 36 can support outer cover middle cover while expanding and contracting and when fully expanded. One way to do this is to provide reinforcement covers 36 and 46 with substantially the same yarn pitch when extended, so that they expand radially in proportion to each other and provide internal pressure support for each other throughout the expansion of the hose. Of course, the appropriate extended diameters of covers 36 and 46 can be used to allow them to support each other during use (middle cover 36 fitting snugly within outer cover 36 when extended). Outer cover 36 can also be designed to interact with middle cover 46 in such a way that encourages outer cover 36 to form evenly spaced and like-sized annular ridges 36r along its length when the hose is retracted (e.g., by attaching outer cover 36 to middle cover 46 at locations which should be valleys in the pleated shape to be taken when the hose retracts), and provide a visually pleasing exterior surface for bungee hose 40.

In FIGS. 3A-B, bungee hose 50 can operate in substantially the same way that retractable bungee hoses 30 and 40 operate with a few differences. The addition of a plurality of wear resistant rings 39 helps stabilize the folding and unfolding (pleating and un-pleating) of hose cover 36 as bungee hose 50 extends and retracts. Thus, wear rings 39 also tend to hold cover 36 outward at approximately the diameter D3 when retracted, but deforms when hose 50 is pressurized internally. This causes hose 50 to extend, outer cover 36 to unfold, and the diameter of cover 36 to shrink. If wear rings 39 are made of an elastic or pliable material, the diameter of rings 39 can be pulled to a significantly smaller diameter than diameter D3 by outer cover 36. This pulling on rings 39 by cover 36 is offset by and equal and opposite force that tends to lift rings 39 above the outer surface of cover 36 and help protect cover 36 from damage. In alternate designs, cover 36 and/or elastic tube 44 can also be impregnated with a lubricant before assembly to provide additional wear protection for the elastic tube. The lubricant can also facilitate retraction of the outer cover into a pleated shape by allowing it to more easily slide into the desired shape, and by making it less likely that various components will inadvertently bind to each other in a manner which would cause the outer cover to collapse in a different manner.

In FIGS. [4A-B] *4A-C*, bungee cords 60 [and], 63 *and 65* can operate in substantially the same way as standard bungee cords, with hook ends 62 allowing them to attach to various places on vehicles to tie down items. The bungee cord itself, comprising pleated cover 36 and an elastic core (i.e., elastic tube 34 [and], elastic cord 64 *and a plurality of elastic cords 67*) allow it to stretch to hold these items in place. Unlike typical bungee cords, the disclosed bungee cord can stretch to over six times its original length to wrap and hold objects that need securing.

In FIGS. 5A-B, bungee hose 70 can operate in substantially the same way that retractable bungee hoses 30, 40 and 50 operate, with a few differences. The hard melted portions 77 tend to give pleated cover 70 a very strong tendency to return to its original pleated position (see FIG. 5A) even after harsh use in an extended position like that seen in FIG. 5B. Also, melted portions 77 can help to protect yarns 36a-b from snagging on rough surfaces like concrete and brick. Melted portions 77 also allow braided cover 76 becomes nearly cylindrical when in use as seen in FIG. 5B, however melted portions 77 still remember their annular pleated position and ensure cover 76 returns to that pleated shape after use (see FIG. 5A).

In FIGS. 5A-B, pleated cover 76 is shown operating as a cover for an extendible and retractable hose. The operation of cover 76 is substantially automatic when longitudinal extending and retracting forces are applied. These longitudinal forces come from internal forces or external forces, and can be provided by hose components and operational features including (but not limited to): an elastic tube, a hydraulic pressure differential between the interior and exterior of the hose, a coiled spring, an elastic cord, though other internal or external sources (e.g., a hose user, who could provide an external extending force by pulling on the hose) could also provide extending or retracting forces for the hose. A longitudinal compressive/retracting force tends to compress cover 76 into a series of annular pleats as seen on the left side of FIG. 5A. Longitudinal extending force (or tension force) tends to pull the pleats apart and extend cover 76 longitudinally as seen in FIG. 5B. In FIGS. 5A-B, pleated cover 76 is being used in extendible and retractable bungee hose 70 where the compressive force comes from the inner elastic tube 34. Once stretched, elastic tube 34 has the potential to cause cover 76 to be compressed longitudinally to its retracted position seen in FIG. 5A. When water pressure supplied to connector 22, in combination with a flow restricting attachment (spray nozzle) attached to output connector 28, the interior of elastic tube 34 is pressurized, generating an extending force that creates a tension between ends 22 and 28. This extending force extends cover 76 and also provides a radially outward pressure to press cover 76 into a substantially cylindrical shape. The rings formed by melted portions 77 tend to hold their position during use, because some of the fibers are bonded together, which can also allow the rings to function as hard shapes that do not tend to slide pass each other easily. Thus, when water pressure is released from hose 70, elastic tube 34 creates a net compressive force on pleated cover 76, and the melted portions 77 tend to compress cover 76 back into its repeating series of annular pleats seen in FIG. 5A.

RAMIFICATIONS, AND SCOPE

The use of a radially expandable and longitudinally stretchable outer cover with an inner elastic tube significantly changes the dynamics of a retractable hose (bungee hose) and its operational characteristics. An outer cover such as disclosed herein can be implemented to facilitate stretching longitudinally and radially by orienting all the yarns that comprise the outer cover at an acute angle with respect to the longitudinal axis of the bungee hose (yarns oriented neither longitudinal nor tangential).

Although the above description contains many concrete examples, these should not be viewed as limiting the scope of the protection provided by this or any related document. Instead, the above description should be considered illustrative of some of the presently preferred approaches to implementing aspects of the inventor's technology. For example, many alternate solid and liquid lubricants can be used, and, in implementations where an outer cover is bonded to an inner elastic tube, many different ways of bonding can be used to achieve specific characteristics for a particular bungee hose. The choice of material for the inner elastic tube and the outer cover is very diverse and many natural and synthetic polymers can be used. Also, many additional combinations of outer cover, lubricants, inner elastic tube, and bonding methods are possible. Finally, while a hollow circular braided tube is the presently preferred structure for the outer cover of the bungee hose, many other knits, braid styles, and weaves can be substituted that provide a regular repeating pleated pattern and allows the hose to retract radially when extended longitudinally and expands radially when longitudinally retracted.

Thus, the scope of this invention should not be limited to the above examples but should be determined from the following claims.

Accordingly, I claim:

1. A tube comprising a plurality of left-handed and right-handed fibers braided to form a channel inside the tube and adapted to longitudinally extend from a compressed length to an extended length in response to a longitudinal extension force, wherein:

[a)] the tube is adapted to, when contracting from its extended length to its compressed length, compress into a plurality of annular pleats, each annular pleat comprising an annular ridge and an annular valley and having an inner diameter which is greater at the annular ridge than at the annular valley; [and b) for each annular pleat, the annular ridge from that annular pleat and the annular valley from that annular pleat are both centered around a longitudinal axis of the channel inside the tube;]

wherein the tube [is adapted to compress] *compresses* into the plurality of annular pleats [based on] *as a result of* the plurality of left-handed and right-handed fibers being heat set into a configuration comprising the plurality of annular pleats; and wherein each annular ridge from the plurality of annular pleats comprises a plurality of areas melted in the pleated configuration.

2. The tube of claim 1, wherein the plurality left-handed and right-handed fibers define a first pitch angle between about 5 to 20 degrees when the tube is at the compressed length.

3. The tube of claim 2, wherein the plurality left-handed and right-handed fibers define a second pitch angle of about 30 degrees when the tube is at the extended length.

4. The tube of claim 1, wherein the extended length is at least four times the compressed length.

5. The tube of claim 1, wherein the tube comprises a middle cover disposed in the channel inside the tube.

6. The tube of claim 1, wherein the tube [is adapted to compress] *further compresses* into the plurality of annular pleats [based on, for each annular pleat from the plurality of annular pleats,] *as a result of* a polymer material being bonded to the annular ridge of that annular pleat.

7. The tube of claim 1, wherein the fibers from the plurality of left-handed fibers and the plurality of right-handed fibers are yarns.

8. A tube comprising a braided fabric comprising a plurality of right and left handed fibers formed into a circular braid defining an interior channel, wherein the braided fabric is adapted to:

a) longitudinally extend from a compressed length to an extended length in response to a longitudinal extension force;

b) compress from the extended length to the compressed length in response to a longitudinal compression force; and c) form a plurality of repeating annular pleats when at the compressed length;

wherein the braided fabric [is adapted to form] *forms* the plurality of repeating annular pleats [based on] *as a result of* being heat set into a configuration comprising the plurality of annular pleats; and wherein each pleat from the plurality of repeating annular pleats comprises an annular ridge, and wherein the fibers comprised by the braided tube are melted at the annular ridges from the plurality of repeating annular pleats.

9. The tube of claim 8, wherein the braided fabric [is adapted to form] *further forms* the plurality of repeating annular pleats [based on] *as a results of* a polymer material bonded to the braided fabric.

10. The braided tube of claim 9, wherein:

a) each annular pleat from the plurality of repeating annular pleats comprises an annular ridge; and b) the polymer material is bonded to the annular ridges from the plurality of annular pleats.

11. A tube comprising:

a) a tube shaped cover comprising a plurality of left-handed and right-handed fibers braided to form a channel inside the tube shaped cover and adapted to longitudinally extend from a compressed length to an extended length in response to a longitudinal extension force;

b) a pleat forming means for forming a plurality of annular pleats along a length of the tube shaped outer cover when it contracts from the extended length to the compressed length, wherein[:

i)] each annular pleat from the plurality of annular pleats comprises an annular ridge and an annular valley and has an inner diameter which is greater at its annular ridge than at its annular valley; [and ii) for each annular pleat, the annular ridge from that annular pleat and the annular valley from that annular pleat are both centered around a longitudinal axis of the channel inside the tube shaped cover;]

wherein the pleat forming means is the plurality of left-handed and right-handed fibers, the plurality of left-handed and right-handed fibers having been heat set into a configuration comprising the plurality of annular pleats; and wherein the plurality of left-handed and the plurality of right-handed fibers comprise melted portions.

12. The tube of claim 11, wherein the pleat forming means comprises a polymer material bonded to the plurality of annular pleats.

13. The tube of claim 12, wherein the polymer material comprises a polymer material bonded to the annular ridges from the plurality of annular pleats.

14. The tube of claim 7, wherein the plurality of areas melted in the pleated configuration are melted sufficiently to make the yarns resistant to sliding past one another.

15. The tube of claim 7, wherein:

a) the yarns comprise individual yarns, each of the individual yarns comprising a plurality of filaments; and b) the yarns in the plurality of areas melted in the pleated configuration are partially bonded, with the bonding primarily being between filaments within individual yarns.

16. A tube comprising a plurality of left-handed and right-handed fibers braided to form a channel inside the tube and adapted to longitudinally extend from a compressed length to an extended length in response to a longitudinal extension force, wherein[:

a)] the tube is adapted to, when contracting from its extended length to its compressed length, compress into a plurality of annular pleats, each annular pleat comprising an annular ridge and an annular valley and having an inner diameter which is greater at the annular ridge than at the annular valley; [and b) for each annular pleat, the annular ridge from that annular pleat and the annular valley from that annular pleat are both centered around a longitudinal axis of the channel inside the tube;]

wherein the tube [is adapted to compress] *compresses* into the plurality of annular pleats [based on, for each annular pleat from the plurality of annular pleats,] *as a result of* a polymer material being bonded to the annular ridge of [that] *each* annular pleat.

17. A tube comprising a braided fabric comprising a plurality of right and left handed fibers formed into a circular braid defining an interior channel, wherein the braided fabric is adapted to:

a) longitudinally extend from a compressed length to an extended length in response to a longitudinal extension force;

b) compress from the extended length to the compressed length in response to a longitudinal compression force; and c) form a plurality of repeating annular pleats when at the compressed length;

wherein the braided fabric [is adapted to form] *forms* the plurality of repeating annular pleats [based on] *as a result of* a polymer material bonded to the braided fabric.

18. The braided tube of claim 17, wherein:

a) each annular pleat from the plurality of repeating annular pleats comprises an annular ridge; and b) the polymer material is bonded to the annular ridges from the plurality of annular pleats.

19. A tube comprising:

a) a tube shaped cover comprising a plurality of left-handed and right-handed fibers braided to form a channel inside the tube shaped cover and adapted to longitudinally extend from a compressed length to an extended length in response to a longitudinal extension force;

b) a pleat forming means for forming a plurality of annular pleats along a length of the tube shaped outer cover when it contracts from the extended length to the compressed length, wherein[:

i)] each annular pleat from the plurality of annular pleats comprises an annular ridge and an annular valley and has an inner diameter which is greater at its annular ridge than at its annular valley; [and ii) for each annular pleat, the annular ridge from that annular pleat and the annular valley from that annular pleat are both centered around a longitudinal axis of the channel inside the tube shaped cover;]

wherein the pleat forming means comprises a polymer material bonded to the plurality of annular pleats.

20. The tube of claim 19, wherein the polymer material comprises a polymer material bonded to the annular ridges from the plurality of annular pleats.

*21. A bungee cord adapted to longitudinally extend from a retracted length to a stretched length in response to a longitudinal extension force, the bungee cord comprising:*

*a tube-shaped outer cover made of a fabric that folds when the bungee cord transitions to the retracted length, wherein the fabric of the tube-shaped outer cover is braided and comprises a plurality of left-handed and right-handed fibers braided to form a channel inside the outer cover, and wherein the outer cover is adapted to longitudinally extend from a compressed length to an extended length in response to the longitudinal extension force;*

*an inner elastic core positioned within the outer cover;*

*a first hook end coupled to the outer cover and the inner elastic core at a first end of the bungee cord; and*

*a second hook end coupled to the outer cover and the inner elastic core at a second end of the bungee cord,*

*wherein the outer cover at the compressed length defines a plurality of annular pleats and each annular pleat provides an annular ridge and an annular valley, and*

*wherein the plurality of left-handed and right-handed fibers are heat set into a configuration that forms the plurality of annular pleats.*

*22. The bungee cord of claim 21, wherein the stretched length is at least three times the retracted length.*

*23. The bungee cord of claim 21, wherein the stretched length is at least four times the retracted length.*

*24. The bungee cord of claim 21, wherein the stretched length is at least six times the retracted length.*

*25. The bungee cord of claim 21, wherein the inner elastic core comprises an elastic hose defining an interior channel.*

*26. The bungee cord of claim 21, wherein the inner elastic core comprises a solid elastic cord.*

*27. The bungee cord of claim 21, wherein the inner elastic core comprises a plurality of elastic cords.*

*28. The bungee cord of claim 21, wherein the fabric of the tube-shaped outer cover is woven and adapted to longitudinally extend from a compressed length to an extended length in response to the longitudinal extension force.*

*29. The bungee cord of claim 28, wherein the tube-shaped outer cover crumples when transitioned to the compressed length.*

*30. The bungee cord of claim 21, wherein the plurality of annular pleats are further defined by bonding a polymer to the left-handed and right-handed fibers at each annular ridge.*

*31. The bungee cord of claim 21, wherein the plurality left-handed and right-handed fibers define a first pitch angle between about 5 to 20 degrees when the outer cover is at the compressed length.*

*32. The bungee cord of claim 21, further comprising a middle cover interposing the outer cover and the inner elastic core.*

*33. The bungee cord of claim 21, further comprising a lubricant interposing the outer cover and the inner elastic core.*

*34. A bungee cord adapted to longitudinally extend from a retracted length to a stretched length in response to a longitudinal extension force, the bungee cord comprising:*

*a tube-shaped outer cover made of a woven fabric that folds and crumples to form a plurality of annular pleats when the bungee cord transitions to the retracted length;*

*an inner elastic core positioned within the outer cover;*

*a first hook end coupled to the outer cover and the inner elastic core at a first end of the bungee cord; and*

*a second hook end coupled to the outer cover and the inner elastic core at a second end of the bungee cord, wherein the plurality of annular pleats are heat set into a configuration that forms the plurality of annular pleats.*

*35. A bungee cord adapted to longitudinally extend from a retracted length to a stretched length in response to a longitudinal extension force, the bungee cord comprising:*

*a tube-shaped outer cover made of a braided fabric comprising a plurality of left-handed and right-handed fibers braided to form an inner channel, and wherein the outer cover is adapted to longitudinally extend from a compressed length to an extended length in response to the longitudinal extension force;*

*an inner elastic core positioned within the inner channel;*

*a first hook end coupled to the outer cover and the inner elastic core at a first end of the bungee cord; and*

*a second hook end coupled to the outer cover and the inner elastic core at a second end of the bungee cord, wherein the outer cover at the compressed length defines a plurality of annular pleats and each annular pleat provides an annular ridge and an annular valley, and wherein the plurality of annular pleats are defined by bonding a polymer to the left-handed and right-handed fibers at each annular ridge.*

*36. The bungee cord of claim 35, wherein the plurality of left-handed and right-handed fibers are further heat set into a configuration that forms the plurality of annular pleats.*

* * * * *